United States Patent [19]

Hayashi et al.

[11] Patent Number: 4,803,628
[45] Date of Patent: Feb. 7, 1989

[54] METHOD AND APPARATUS FOR CONTROLLING ELECTRO-MAGNETIC PARTICLE CLUTCH

[75] Inventors: Takashi Hayashi; Setsuo Tokoro; Tomoyuki Watanabe, all of Susono; Takashi Shigematsu, Mishima, all of Japan

[73] Assignee: Toyota Jidosha Kabushiki Kaisha, Aichi, Japan

[21] Appl. No.: 891,317

[22] Filed: Jul. 31, 1986

[30] Foreign Application Priority Data

Aug. 2, 1985 [JP] Japan .................. 171665/85

[51] Int. Cl.⁴ .................. F16H 5/66; B60K 20/02
[52] U.S. Cl. .................. 364/424.1; 192/0.032; 192/0.052; 192/0.076
[58] Field of Search .................. 364/424, 424.1, 426; 192/0.076, 0.096, 0.032, 21.5, 0.03, 3.56, 0.052; 74/866

[56] References Cited

U.S. PATENT DOCUMENTS

| 4,425,992 | 1/1984 | Makita | 192/21.5 |
| 4,606,446 | 8/1986 | Watanabe | 192/21.5 |
| 4,675,817 | 6/1987 | Sakakiyama et al. | 192/0.032 |
| 4,680,712 | 7/1987 | Sakakiyama | 192/0.076 |
| 4,714,864 | 12/1987 | Yogo et al. | 364/426 |
| 4,730,711 | 3/1988 | Sakakiyama | 192/0.076 |

FOREIGN PATENT DOCUMENTS

| 2467725 | 4/1981 | France . |
| 0037357 | 3/1983 | Japan .................. 192/3.56 |
| 2088011 | 6/1982 | United Kingdom . |

Primary Examiner—Parshotam S. Lall
Assistant Examiner—Ellis B. Ramirez
Attorney, Agent, or Firm—Parkhurst, Oliff & Berridge

[57] ABSTRACT

An apparatus and method for controlling an electro-magnetic particle clutch is provided. The apparatus includes first through third sensors, a memory, first through fourth calculating devices, first through third determining devices and a controller. The first sensor detects a throttle opening and outputs a first detected signal. The second sensor detects an actual engine revolution speed and outputs a second detected signal. The first calculating device calculates an engine torque in accordance with a first relationship and outputs a first calculated signal. The second calculating device calculates a tentative desired revolution speed and outputs a second calculated signal. The third sensor detects at least one of a plurality conditions in which the vehicle begins moving and outputs at least one of a plurality of detected signals. The first determining device determines a total compensation value in accordance with a third relationship and outputs a first determined signal. The third calculating device calculates a desired revolution speed and outputs a third calculated signal. The fourth calculating device calculates a feed back gain in accordance with a fifth relationships and outputs a fourth calculated signal. The second determining device determines an optimum torque in accordance with a sixth relationship, and outputs a second determined signal. The third determining device determines a control voltage in accordance with a seventh relationship, and outputs the third determined signal. The controller controls electric current supplied to a magnetizing coil of the electro-magnetic particle clutch in accordance with the determined control voltage.

53 Claims, 22 Drawing Sheets

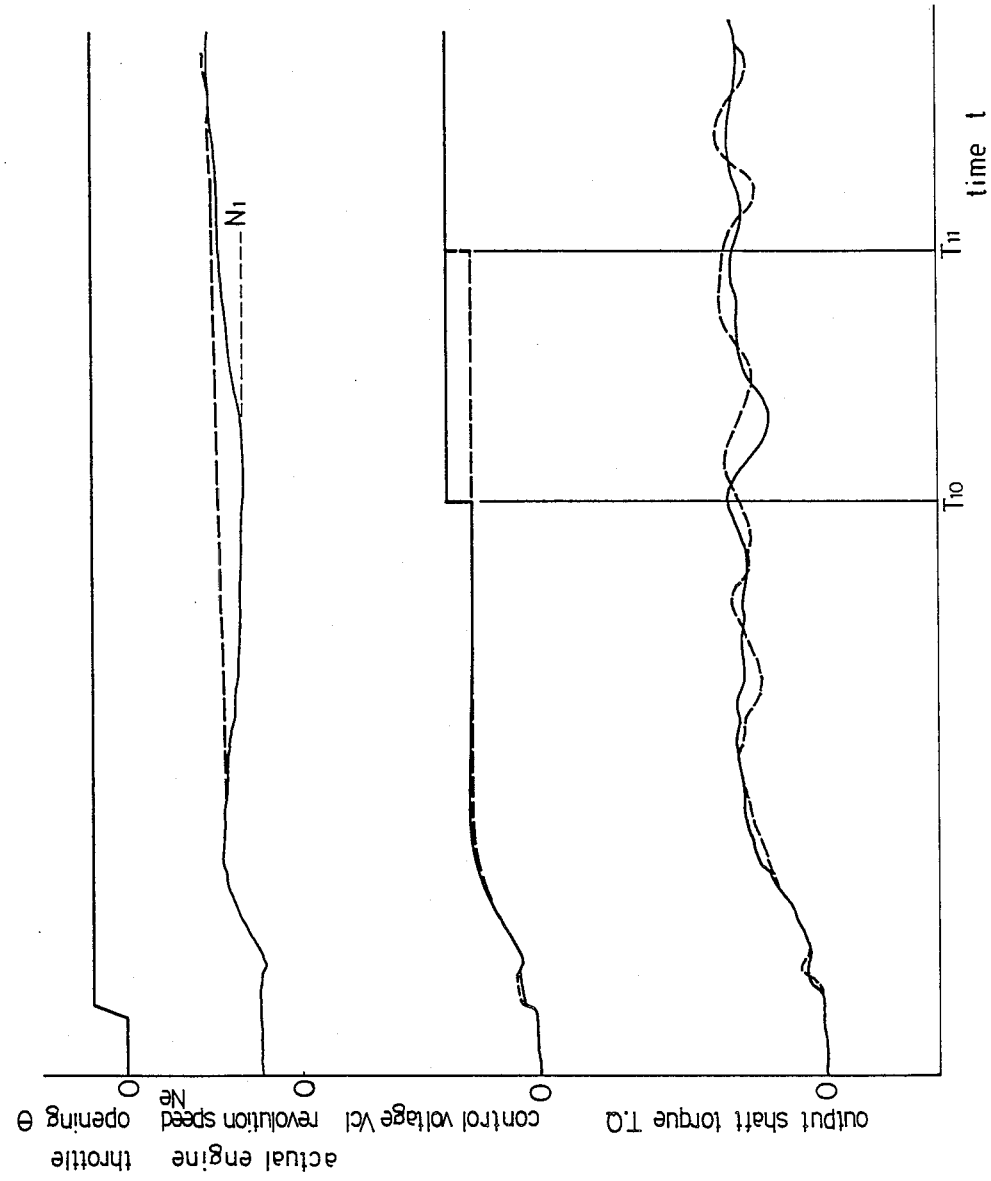

METHOD AND APPARATUS FOR CONTROLLING ELECTRO-MAGNETIC PARTICLE CLUTCH

BACKGROUND OF THE INVENTION

The present invention relates to a method and an apparatus for controlling an electro-magnetic particle clutch which is mounted on a vehicle. More particularly, the present invention relates to improvements in the method and the apparatus for controlling the electro-magnetic particle clutch. The improved method and apparatus provide smooth vehicle acceleration and reduce fuel consumption of the vehicle. The method and apparatus control the clutch in accordance with various conditions in which the vehicle begins moving.

A conventional method for controlling an electro-magnetic particle clutch is disclosed in U.S. Pat. No. 4,403,683. This patent discloses a system for controlling the electro-magnetic particle clutch of a vehicle having an internal combustion engine, a transmission unit, a second switch, a thermo switch and a control circuit.

Another conventional control method and apparatus for controlling an electro-magnetic clutch of a vehicle is disclosed in Japanese Patent Laid Open No. Showa 57-87722. This patent discloses a method and apparatus which can control an amount of torque transmitted in accordance with a detected engine revolution speed and an idling revolution speed of an engine.

However, the other conventional method and apparatus cannot control the amount of torque transmitted in accordance with various conditions under which the vehicle begins moving.

SUMMARY OF THE INVENTION

The present invention was developed in view of the foregoing background and to overcome the foregoing drawbacks. It is accordingly an object of this invention to provide an apparatus for controlling an electro-magnetic particle clutch which can provide smooth vehicle acceleration or which can reduce fuel consumption of the vehicle by controlling the clutch in accordance with various conditions under which the vehicle begins moving.

To achieve smooth acceleration or to reduce fuel consumption, the apparatus for controlling the electro-magnetic particle clutch includes first through third detecting means, a memory means, first through fourth calculating means, first through third determining means and a controlling means.

The first detecting means detects a throttle opening and outputs a first detected signal.

The second detecting means detects an actual engine revolution speed and outputs a second detected signal.

The first calculating means receives the first and second detected signals and calculates an engine torque in accordance with a first relationship. The first relationship uses the detected actual engine revolution speed and the detected throttle opening as parameters. The first calculating means outputs a first calculated signal.

The second calculating means receives the first detected signal and calculates a tentative desired revolution speed in accordance with second relationships. The second relationships use the detected throttle opening as a parameter. The second calculating means outputs a second calculated signal.

The third detecting means detects at least one of various conditions under which the vehicle begins moving and outputs at least one of a plurality of detected signals.

The first determining means receives at least one of the plurality of detected signals and determines a total compensation value in accordance with a set of third relationships. The set of third relationships uses at least one of the detected various conditions as a parameter. The first determining means outputs a first determined signal.

The third calculating means receives the second calculated signal and the first determined signal and calculates a desired revolution speed in accordance with a fourth relationship. The fourth relationship is between the calculated tentative desired revolution speed and the determined total compensation value. The third calculating means outputs a third calculated signal.

The fourth calculating means receives the first detected signal, and calculates a feed back gain in accordance with a fifth relationship which includes the detected throttle opening as a parameter. The fourth calculating means outputs a fourth calculated signal.

The second determining means receives the first and fourth calculated signals, the second detected signal and the third calculated signal, and determines an optimum torque in accordance with a sixth relationship. The sixth relationship is between the detected actual engine revolution speed, the calculated feed back gain and the calculated desired revolution speed. The second determining means outputs the second determined signal.

The third determining means receives the second determined signal and determines a control voltage in accordance with a seventh relationship which has the determined optimum torque as a parameter. The third determining means outputs the third determined signal.

The first through seventh relationships are memorized in the memory means.

The controlling means receives the third determined signal and controls electric current supplied to a magnetizing coil of the electro-magnetic particle clutch in accordance with the determined control voltage.

Accordingly, the torque transmitted by the electro-magnetic particle clutch from the engine to the transmission, is controlled so as to be the optimum torque for starting under at least one of a plurality of a various conditions. As a result, the apparatus functions to accelerate the vehicle smoothly while reducing fuel consumption.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements, and wherein:

FIG. 27(A) is a graph showing a relationship between the throttle opening and time;

FIG. 27(B) is a graph showing relationships between time and the actual engine revolution speed when the throttle opening is changed as shown in FIG. 27(A), wherein the broken line shows the actual engine revolution speed according to the second embodiment when the optimum torque routine of FIG. 22 is used, and the solid line shows the actual engine revolution speed according to the second embodiment when the optimum torque routine of FIG. 24 is used;

FIG. 27(C) is a graph showing relationships between time and the control voltage when the throttle opening is changed according to FIG. 27(A), wherein the broken line shows the control voltage of the second embodiment shown in FIG. 22, and the solid line shows the control voltage of the second embodiment shown in FIG. 24; and FIG. 27(D) is a graph showing relationships between time and the output shaft torque when the throttle opening is changed as shown in FIG. 27(A), wherein the broken line shows the output shaft torque of the second embodiment shown in FIG. 22, and the solid line shows the output shaft torque of the second embodiment shown in FIG. 24.

DETAILED DESCRIPTION OF THE PREFERRED EMBODIMENTS

The present invention will be described in detail with reference to the accompanying drawings which illustrate different embodiments according to the present invention.

Figure 1:
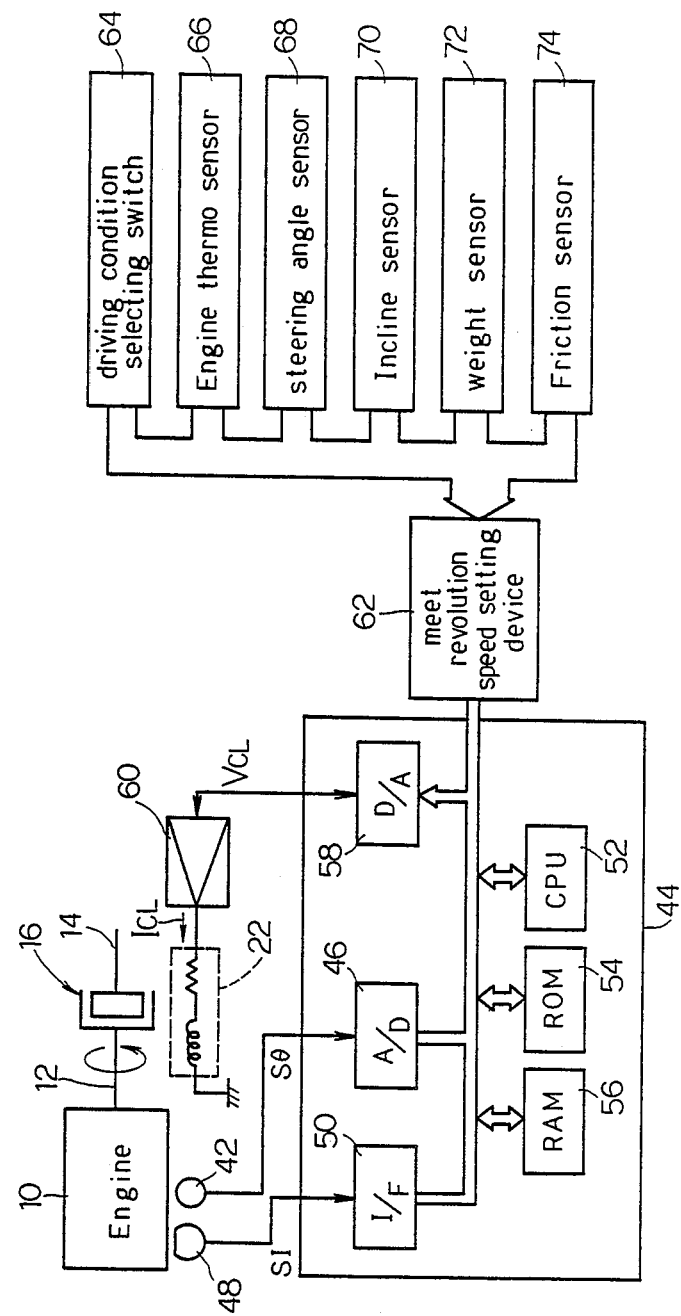
FIG. 1 is a block diagram of the present invention.
Figure 2:
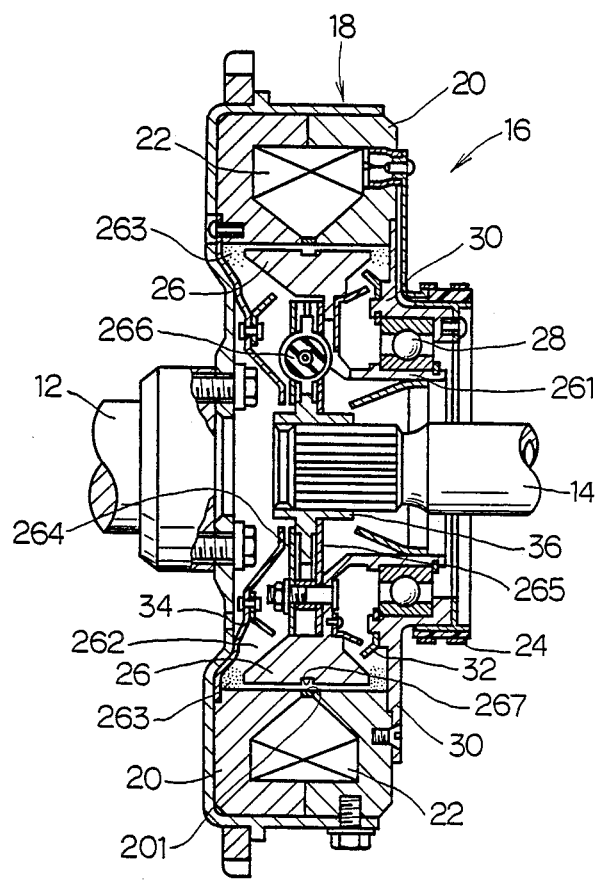
FIG. 2 is an enlarged cross-sectional view of an electro-magnetic particle clutch.

Referring to FIG. 1, an electro-magnetic particle clutch 16 of a vehicle is located between a crank shaft 12 of an engine 10 and an input shaft 14 of a transmission unit (not shown in drawings). As shown in FIG. 2, a disc plate 18 is secured to the crank shaft 12 and an annular yoke 20. The annular yoke 20 comprises a first yoke and a second yoke and is constructed of a ferromagnetic material. The annular yoke 20 is cylindrical in shape, and has an inner frictional face. An annular opening is also defined within the annular yoke 20 and a magnetizing coil 22 is located within the annular opening.

A first labyrinth member 30 extends radially and an end of the first labyrinth member 30 is secured to the annular yoke 20 by a screw. A second labyrinth member 34 also extends radially inward from its secured position at the disc plate 18 and is fixed to the annular yoke 20. The first labyrinth member 30 has an intermediate portion 32 which projects axially toward the left side thereby forming an annular space 262 with the rotor 26. Ball bearing 28 is provided within a bearing housing, which is formed at the inner portion of the first labyrinth member 30. A boss portion 261 of the rotor 26, made of a ferromagnetic material, is rotatably mounted on the bearing housing. The rotor 26 is concentric with the annular yoke 20 and is provided within and is rotatably mounted to the annular yoke 20. An outer peripheral portion of the rotor 26 forms an outer frictional face facing the inner frictional face of the annular yoke 20, thereby defining a narrow annular gap therebetween.

The annular space 262 is defined by both first and second labyrinth members 30 and 34, the annular yoke 20 and the rotor 26. A predetermined amount of magnetic particles 263 are placed into the annular space 262. Because the projections 32 of the first labyrinth member 30 and the second labyrinth member 34 closely abut the rotor 26, the magnetic particles 263, within the annular space 262, are prevented from escaping from the annular space 262. The rotor 26 is provided with a pair of plates 264 and 265. The plate 264 is fixed to the plate 265 by a bolt. The plates 264 and 265 support a plurality of torsion springs 266, made of rubber, which are provided at equal angular intervals and which function as dampers.

A clutch hub 36 is slidably mounted on an axial spline portion of the output shaft 14. The clutch hub 36 is clipped between the plate 264 and the plate 265 and fixed to the rotor 26. Further, the clutch hub 36 has openings in which the torsion springs 266 are provided. The rotation of the rotor 26 is transmitted to the clutch hub 36 through the plates 264 and 265 and the torsion springs 266.

A slip ring 24 is fixed on the outer peripheral face of the first labyrinth member 34. The slip ring 24 supplies electric power to the magnetizing coil 22 by utilizing a battery power source installed in the vehicle, a conductive material and a conductive lead which are provided in a sliding relationship with a brush (not shown in drawings). The brush is held by a bracket (not shown in drawings) made of a phenol resin or a similar material. A ring 201 is made of a diamagnetic material and is provided in a position between the projection of the first yoke and the projection of the second yoke. The ring 201 faces a rectangular cross sectioned, annular groove 267 provided on the outer peripheral portion of the rotor 26.

Figure 3:
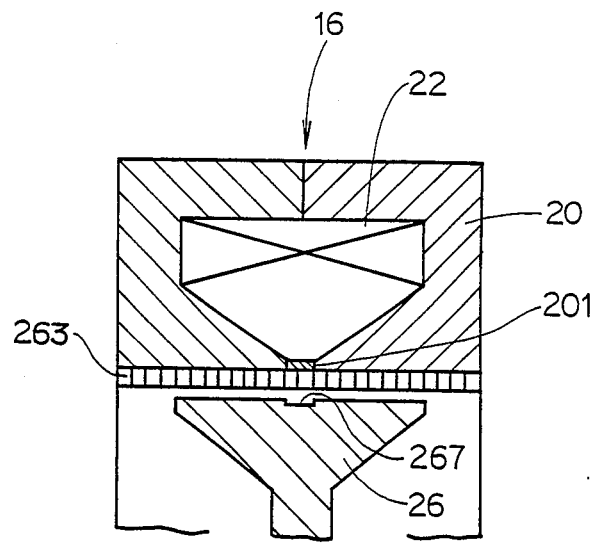
FIG. 3 is a further enlarged cross-sectional view of an annular yoke and a rotor of the electro-magnetic particle clutch, wherein magnetic particles form a layer on the annular yoke and an interval is defined between the layer of magnetic particles and the rotor.

The aforedescribed apparatus functions as follows. When electric power is not supplied to the magnetizing coil 22, and the annular yoke 20 rotates, the magnetic particles 263 are centrifugally forced to the inner frictional face of the annular yoke 20. As shown in FIG. 3, a layer of magnetic particles 263 is formed in a gap defined between the inner face of the yoke 20 and the outer face of the rotor 26. The layer of magnetic particles 263 is spaced by an interval from the outer face of the motor 26. The average thickness of the layer of the magnetic particles 263 is slightly less than the gap between the annular yoke 20 and the rotor 26. Therefore, the rotational movement of the annular yoke 20 is not transmitted to the rotor 26.

Figure 4:
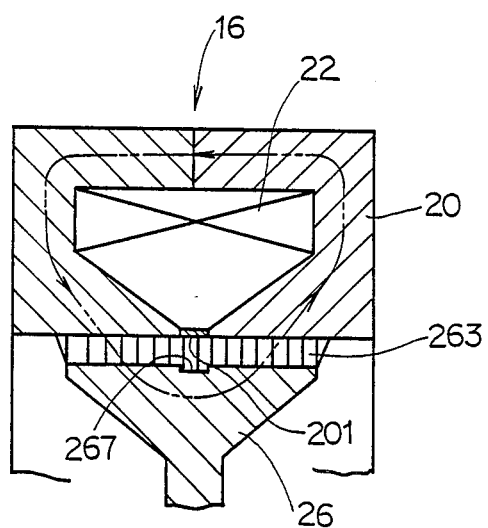
FIG. 4 is a further enlarged cross-sectional view of the annular yoke and the rotor of the electro-magnetic particle clutch, wherein the magnetic particles fill a gap defined between the annular yoke and the rotor.

As shown in FIG. 4, when electric power is supplied to the magnetizing coil 22, the magnetic particles 263 fill in the gap defined between the annular yoke 20 and the rotor 26, because of the magnetic flux which is created between the annular yoke 20 and the rotor 26. Hence, the annular yoke 20 is firmly connected with the rotor 26 resulting in the transmission of rotational movement of the annular yoke 20 to the rotor 26. Accordingly, torque of the crank shaft 12 of the engine 10 is transmitted to the input shaft 14 of the transmission unit in accordance with relationships shown in FIG. 5.

The diamagnetic ring 201 and the annular groove 267 prevent the generated magnetic flux from being concentrated in one small area. This distribution of magnetic flux results in the magnetic particles 263 being uniformly distributed in the gap defined between the annular yoke 20 and the rotor 26, thereby allowing for an efficient transmission of torque from the annular yoke 20 to the rotor 26.

The torsion spring 266 may absorb shocks caused by an engagement of the annular yoke 20 and the rotor 26. The torque, transmitted to the input shaft 14 of the transmission unit, is further transmitted to a differential gear unit (not shown in drawings) and driving wheels (not shown in drawings) of the vehicle.

As shown in FIG. 1, a throttle sensor 42 is mounted on a throttle valve (not shown in drawings) of the engine 10. The throttle sensor 42 detects an amount "$\theta$" of an opening of the throttle valve. Normally, the amount "$\theta$" of the opening of the throttle valve represents an output power required by an operator, so that the throttle sensor 42 comprises a detecting means for detecting the required output power. When the throttle sensor 42 detects the amount "$\theta$" of the opening of the throttle valve, the throttle sensor 42 outputs a throttle signal "$S\theta$" in accordance with the amount of "$\theta$" of the opening of the throttle valve. The throttle signal "$S\theta$" is inputted in an analog-to-digital converter 46 of a controller 44. An ignitor 48, mounted on the engine 10, outputs an ignition signal "SI" in accordance with an ignition pulse of the engine 10. The ignition signal "SI" is inputted in an interface circuit 50 of the controller 44, and the interface circuit 50 changes the ignition signal "SI" to an ignition period "Tig" which is used for calculating an actual engine revolution speed "Ne".

Figure 5:
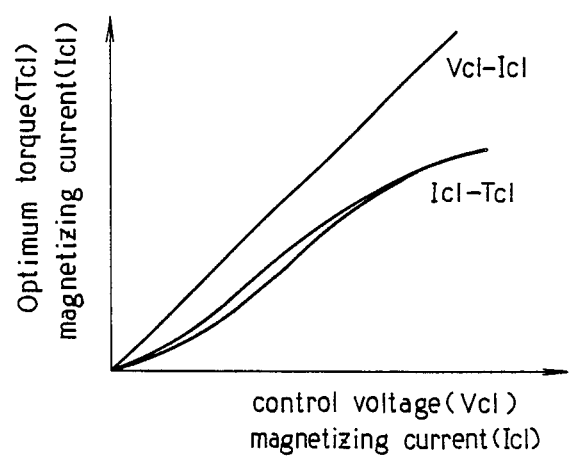
FIG. 5 is a graph showing a relationship between control voltage and magnetizing current and relationships between the magnetizing current and an optimum torque.

The controller 44 comprises a micro-computer and includes a central processing unit (hereinafter "CPU") 52, a read only memory (hereinafter "ROM") 54 and a random access memory (hereinafter "RAM") 56. The CPU 52 use a temporal memory function of the RAM 56 and processes received signals in accordance with programs previously memorized in the ROM 54. The CPU 52 outputs a control voltage "Vcl" to an amplifier 60 through a digital-to-analog converter 58. The amplifier 60 charges a voltage corresponding to the control voltage "Vcl" to the magnetizing coil 22, so that a magnetizing current "Icl" is supplied to the magnetizing coil 22. As shown in FIG. 5, the magnetizing current "Icl", is in proportion to the control voltage "Vcl" because of a constant resistance of the magnetizing coil 22.

It is apparent to those skilled in the art that instead of the amplifier 60, a constant current circuit may be used to supply the magnetizing current "Icl", which is proportional to the control voltage "Vcl", by a current feed back regardless of changes of an impedance of the magnetizing coil 22.

A meet revolution speed setting device 62 is connected to a data bus line of the controller 44. The meet revolution speed setting device 62 receives output signals from a driving condition selecting switch 64, an engine thermo sensor 66, a steering angle sensor 68, an incline sensor 70, a weight sensor 72 and a friction sensor 74.

The driving condition selecting switch 64 can select an economical driving condition, a normal driving condition and a power driving condition by the operation of a switch (not shown in drawings). The driving condition selecting switch 64 outputs a signal in accordance with the selected driving condition. The engine thermosensor 66 detects the temperature of the engine 10 (e.g., a temperature of a cooling water of the engine 10) and outputs a signal in accordance with the detected temperature of the engine 10. The steering angle sensor 68 detects a steering angle of a steering wheel (not shown in drawings) and outputs a signal in accordance with the detected steering angle of the steering wheel.

The incline sensor 70 detects an incline of a road on which the vehicle begins moving and outputs a signal in accordance with the detected incline of the road. The weight sensor 72 is mounted on a suspension mechanism (not shown in drawings) of the vehicle and the weight sensor 72 detects a weight of the vehicle. The weight sensor 72 outputs a signal in accordance with the detected weight of the vehicle. The friction sensor 74 detects a friction coefficient of the road on which the vehicle beings moving (i.e., the friction coefficient of a wet road is different from the friction coefficient of a paved road, a gravel road and a snow covered road.) The friction sensor 74 outputs a signal in accordance with the detected friction coefficient of the road.

The meet revolution speed setting device 62 comprises a central processing unit. The meet revolution speed setting device 62 processes the signals received in accordance with the programs previously memorized in the ROM 54. Then the meet revolution speed setting device 62 determines a meet revolution speed "$N_1$".

The meet revolution speed "$N_1$" (i.e., a desired revolution speed) is the revolution speed of the engine when an output torque of the engine coincides with a torque of the electro-magnetic particle clutch.

Figure 6:
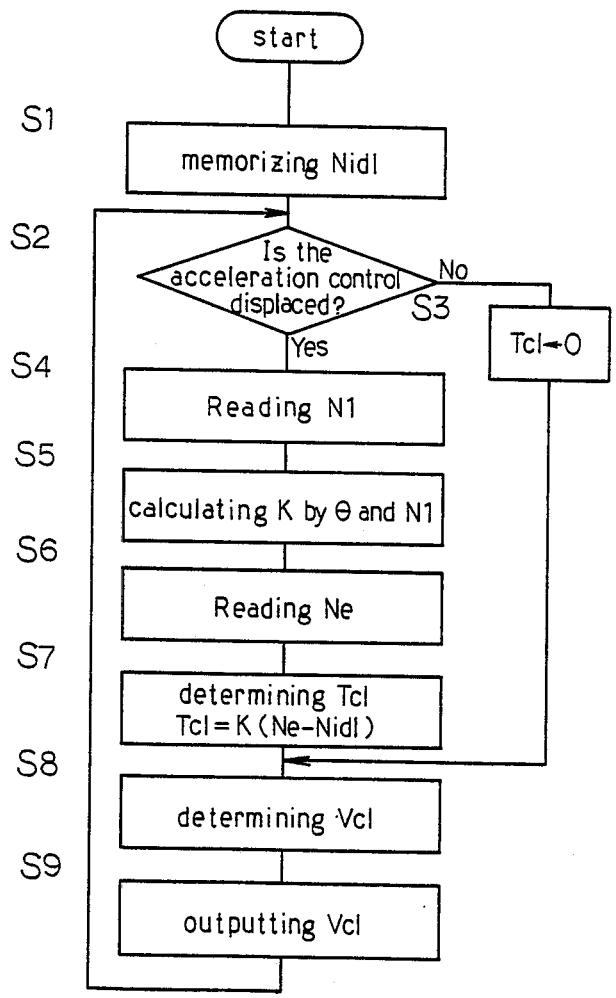
FIG. 6 is a flow chart illustrating a control voltage determination routine.

The operation of the above embodiment is described hereinafter. As shown in FIG. 6, in a first step "$S_1$", an idle revolution speed "Nidl" of the engine 10 is memorized in accordance with an adaptive control which is controlled by a certain algorithm. In a second step "$S_2$", it is determined if an acceleration pedal is depressed (i.e., whether the detected throttle opening "$\theta$" is larger than a predetermined small value). The throttle signal "$S\theta$" received from the throttle opening sensor 42 is used for this determination. When the second step "$S_2$" determines that the acceleration pedal is not depressed a third step "$S_3$" is conducted. As a result, an optimum torque "Tcl", which is the torque which should be transmitted to the input shaft 14 of the transmission unit, is determined to be "Zero". On the other hand, when the second step "$S_2$" determines that the acceleration pedal is depressed, a fourth step "$S_4$" is conducted. As a result, the meet revolution speed "$N_1$", which is continually determined by the meet revolution speed setting device 62, is read.

Figure 7:
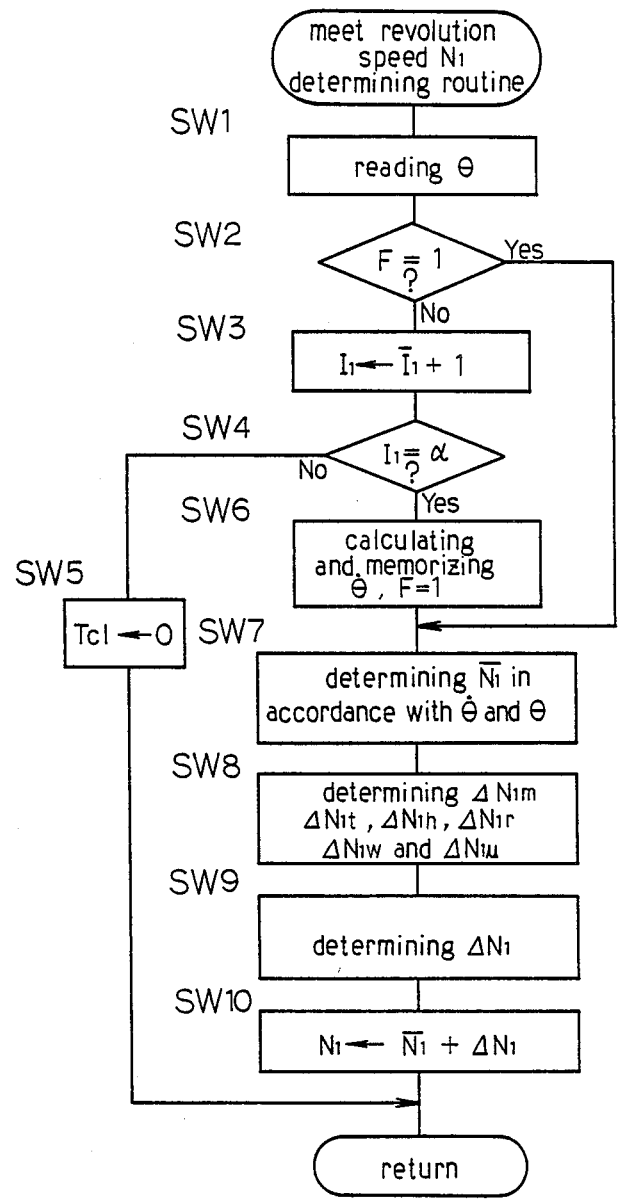
FIG. 7 is a flow chart illustrating a meet revolution speed determining routine which is employed in the control voltage determining routine shown in FIG. 6.

The meet revolution speed setting device 62 repeatedly conducts a meet revolution speed "$N_1$" determining routine shown in FIG. 7. In a step "SW1", the throttle opening "$\theta$" is read from the throttle signal "$S\theta$" received and step "SW2" determines whether a flag "F" is set. When the flag "F" is set the step "SW2" has a value "1". The value "1" of the flag "F" means that a velocity of change "$\dot{\theta}$" of the throttle opening "$\theta$" was calculated during the starting operation of the vehicle. When each starting operation of the vehicle is completely finished, the flag "F" is reset (i.e., the value of the flag "F" becomes "Zero"). Normally, just after the vehicle is started the velocity of change "$\dot{\theta}$" of the throttle opening "$\theta$" is not calculated (i.e., the value of the flag "F" is "Zero"). Accordingly, a step "SW3" is conducted after the step "SW2" just after the starting operation.

The step "SW3" adds a value "1" to a previously added value "$\bar{I}_1$" of a counter of the meet revolution speed setting device 62 and step "SW4" determines whether the added value "$I_1$" of the counter reaches a predetermined value "$\alpha$". For example, the predetermined value "$\alpha$" corresponds to 100 m/sec which corresponds to a time period for calculating the velocity of change "$\dot{\theta}$" of the throttle opening "$\theta$" during each starting operation of the vehicle. Just after the starting operation of the vehicle, the added value "$I_1$" of the counter does not reach the predetermined value "$\alpha$". As a result, a step "SW5" is conducted, so that the optimum torque "Tcl", which should be controlled, is determined to be "Zero".

On the other hand, when the added value "$I_1$" of the counter reaches the predetermined value "$\alpha$" a step "SW6" is conducted. As a result, the velocity of change "$\dot{\theta}$" of the throttle opening "$\theta$" calculated using the amount "$\theta$" of the throttle opening detected at this point in time and the time period from the starting point of time of the starting operation of the vehicle to this point in time, which corresponds the predetermined value "$\alpha$" (i.e., about 100 m/sec). Then, the velocity of change "$\dot{\theta}$" is memorized and the flag "F", which has the value "1", is set.

After step "SW6", in step "SW7", a tentative meet revolution speed "$\bar{N}_1$" is determined using previously memorized relationships in accordance with the calculated velocity of change "$\dot{\theta}$" and the detected throttle opening "$\theta$" at this point of time.

Figure 8:
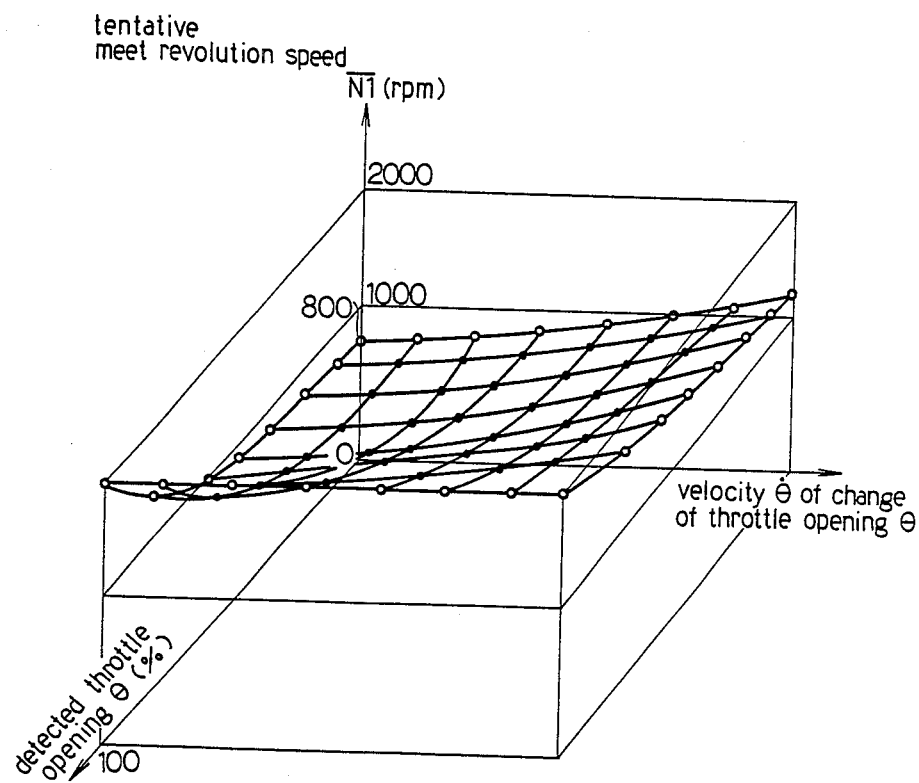
FIG. 8 is a graph showing the relationship between the meet revolution speed, velocity of change of the throttle opening and the detected throttle opening.

The previously memorized relationships between the tentative meet revolution speed "$\bar{N}_1$", the velocity of change "$\dot{\theta}$" of the throttle opening "$\theta$" and the detected throttle opening "$\theta$" are shown in FIG. 8 and the predetermined relationships are previously memorized in the form of a data map in the ROM 54.

When the detected throttle opening "$\theta$" or the velocity of change "$\dot{\theta}$" is located between memorized data on the data map, the tentative meet revolution speed "$\bar{N}_1$" is determined by linear interpolation.

It is appear to those skilled in the art that the predetermined relationships may be previously memorized in the form of function in the ROM 54, and that a rate of change of the throttle opening is used instead of the velocity of change "$\dot{\theta}$".

Figure 9:
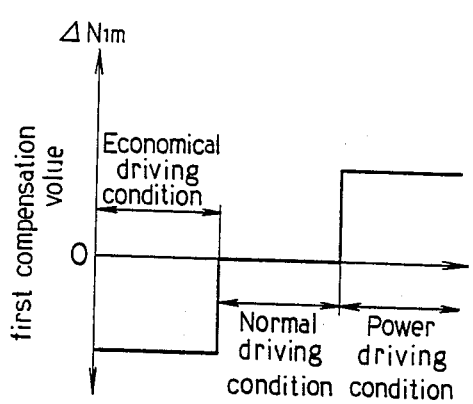
FIG. 9 is a graph showing the relationship between a first compensation value and driving conditions.

After step "SW7", step "SW8" is conducted. A first compensation value "$\Delta N_1 m$" is determined in accordance with previously memorized driving condition relationships between the first compensation value "$\Delta N_1 m$" and the driving conditions which are shown in FIG. 9. The first compensation value "$\Delta N_1 m$" is determined by the operation of the driving condition selecting switch 64. Accordingly, when the power driving condition is selected the first compensation value "$\Delta N_1 m$" is large (more than Zero), so that the vehicle can accelerate rapidly when starting to move. On the other hand, when the economical driving condition is selected the first compensation value "$\Delta N_{1m}$" is small (below Zero), so that the vehicle does not spend much fuel when starting to move. Further, when the normal driving condition is selected the first compensation value "$\Delta N_1 m$" is an intermediate value (equalling Zero). The driving condition relationships are previously memorized in a form of a data map in the ROM 54.

Figure 10:
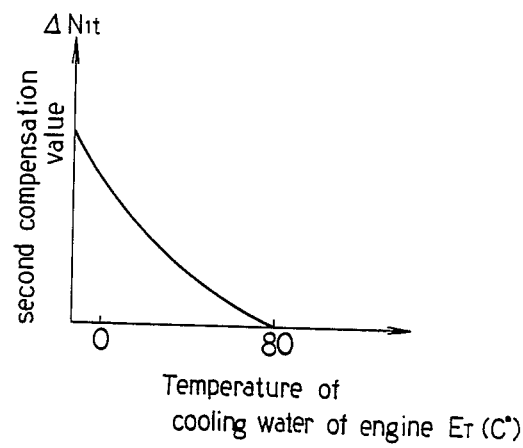
FIG. 10 is a graph showing a relationship between a second compensation value and the temperature of cooling water of an engine.

A second compensation value "$\Delta N_1 t$" is determined according to a previously memorized engine temperature relationship between the second compensation value "$\Delta N_1 t$" and the temperature of the cooling water of the engine "$E_T$" which is shown in FIG. 10. Accordingly, the lower the temperature "$E_T$" of the cooling water of the engine is, the larger the second compensation value "$\Delta N_1 t$" is, so that even when the temperature "$E_T$" of the cooling water of the engine is rather low the vehicle can accelerate smoothly when starting to move as if the temperature "$E_T$" of the cooling water of the engine were normal. The engine temperature relationship is previously memorized in a form of a data map in the ROM 54.

Figure 11:
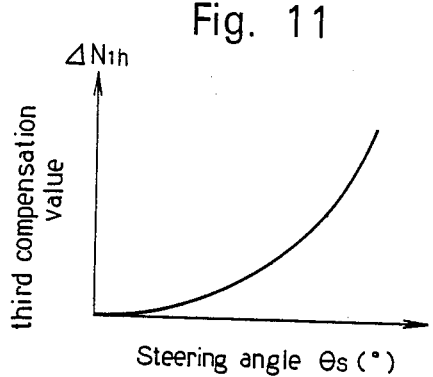
FIG. 11 is a graph showing a relationship between a third compensation value and a steering angle of a steering wheel.

A third compensation value "$\Delta N_1 h$" is determined in accordance with a previously memorized steering angle relationship between the steering angle "$\theta S$" and the third compensation value "$\Delta N_1 h$" which is shown in FIG. 11. Accordingly, the larger the steering angle "$\theta S$" of the steering wheel is the larger the third compensation value "$\Delta N_1 h$" is, so that even when the steering wheel is turned the vehicle can accelerate smoothly when starting to move as if the steering wheel was not turned. The steering angle relationship is previously memorized in the form of a data map in the ROM 54.

Figure 12:
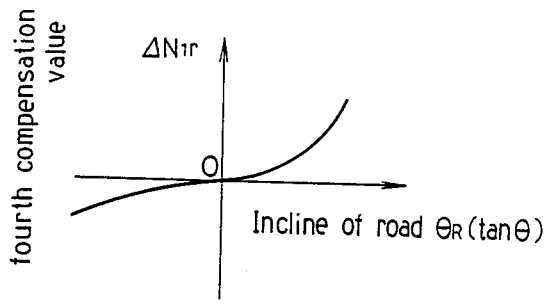
FIG. 12 is a graph showing a relationship between a fourth compensation value and an incline of a road.

A fourth compensation value "$\Delta N_1 r$" is determined according to a previously memorized incline relationship between the fourth compensation value "$\Delta N_1 r$" and the incline "$\theta_R$" of the road which is shown in FIG. 12. Accordingly, when the incline "$\theta_R$" of the road is large and the vehicle starts moving on an upgrade the fourth compensation value "$\Delta N_1 r$" is large. On the other hand, when the incline "$\theta_R$" of the road is large and the vehicle starts on a downgrade, the fourth compensation value "$\Delta N_1 r$" is small (i.e., below "Zero"). As a result, regardless of the change of the driving resistance caused by the incline "$\theta_R$" of the road, the vehicle can accelerate smoothly when starting to move as if the vehicle was starting on a horizontal road. The incline relationship is previously memorized in the form of a data map in the ROM 54.

Figure 13:
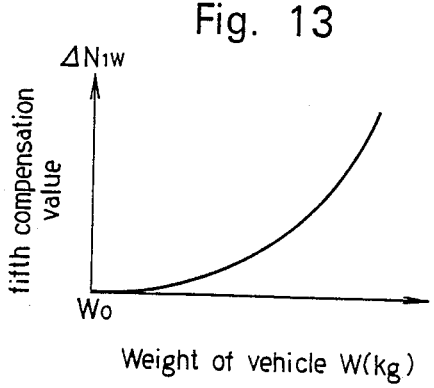
FIG. 13 is a graph showing a relationship between a fifth compensation value and the weight of a vehicle.

A fifth compensation value "$\Delta N_1 w$" is determined in accordance with a previously memorized weight relationship between the fifth compensation value "$\Delta N_1 w$" and the weight "W" of the vehicle which is shown in FIG. 13. Accordingly, the heavier the weight "W" of the vehicle is the larger the fifth compensation value "$\Delta N_1 w$" is, so that even when the weight "W" of the vehicle is rather heavy the vehicle can accelerate smoothly when starting to move as if the vehicle was not carrying any extra weight. The weight relationship is previously memorized in a form of a data map in the ROM 54.

Figure 14:
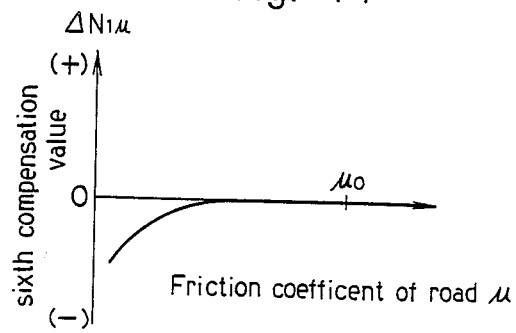
FIG. 14 is a graph showing a relationship between a sixth compensation value and a friction coefficient of the road.

A sixth compensation value "$\Delta N_1 \mu$" is determined in accordance with a previously memorized friction relationship between the sixth compensation value "$\Delta N_1 \mu$" and the friction coefficient "$\mu$" of the road which is shown in FIG. 14. Accordingly, when the friction coefficient "$\mu$" of the road is smaller than a predetermined value the sixth compensation value "$\Delta N_1 \mu$" is below "Zero", so that when the vehicle starts on a wet road, a snow covered road or a gravel road, the sixth compensation value "$\Delta N_1 \mu$" is small. As a result the optimum torque is small, so that the vehicle accelerates smoothly without any slip when starting to move as if the vehicle was starting on a normal dry road. However, a meet revolution speed "$N_1$" cannot be determined below the idle revolution speed "Nidl" even when the friction coefficient "$\mu$" of the road is rather small. The friction relationship is previously memorized in a form of a data map in the ROM 54.

After step "SW8", step "SW9" is conducted. A total compensation value "$\Delta N_1$" is determined in accordance with formula (1) as follows:

$$\Delta N_1 = (\Delta N_1 m + \Delta N_1 t + \Delta N_1 h + \Delta N_1 r + \Delta N_1 w + \Delta N_1 \mu) + \delta, \quad (1)$$

wherein $\delta$ represents a function, which is a negative quantity or a positive quantity, of an output torque "Te" of the engine 10, the meet revolution speed "$N_1$", the throttle opening "$\theta$", the required optimum torque "Tcl" or constants, and which has a very small value (i.e., nearly "Zero").

After step "SW9", step "SW10" is conducted. The determined total compensation value "$\Delta N_1$" is added to the tentative meet revolution speed "$\overline{N}_1$". As a result, the meet revolution speed "$N_1$" is determined and renewed.

Further, when the flag "F" has been set in step "SW2", step "SW7" is conducted. Therefore, steps "SW1", "SW2" and "SW7" through "SW10" are conducted continuously and circularly and the meet revolution speed "$N_1$" is continually determined and renewed.

Figure 15:
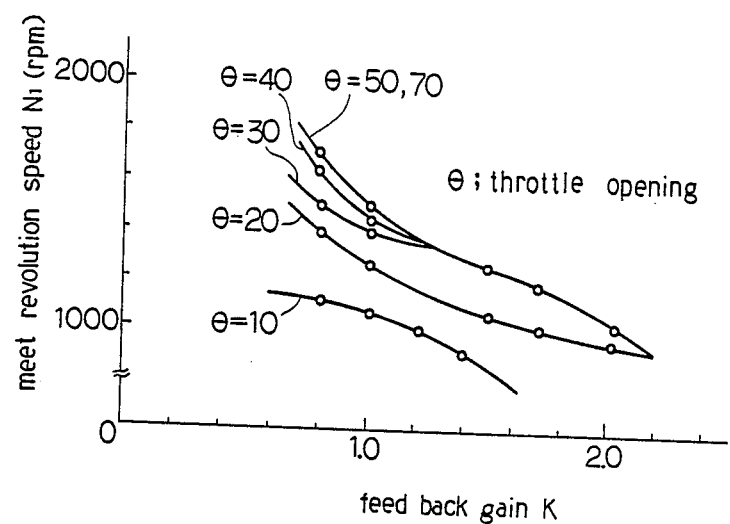
FIG. 15 is a graph showing relationships between the meet revolution speed, feed back gain and the throttle opening.

In FIG. 6, after the fourth step "S4" in which the renewed meet revolution speed "$N_1$" is read, a fifth step "S5" is conducted. A feed back gain "K" is calculated in accordance with a second predetermined relationship between the meet revolution speed "$N_1$", the feed back gain "K" and the throttle opening "$\theta$" by the detected throttle opening "$\theta$" and the read meet revolution speed "$N_1$". The second predetermined relationship is shown in FIG. 15 and memorized in the form of a data-map or a function in the ROM 54. After the fifth step "S5", a sixth step "S6" is conducted, wherein the actual engine revolution speed "Ne" at this point of time is read. After the sixth step "S6" in a seventh step "S7", a value of the transmittal torque "Tcl", which should be controlled, is determined by following a second formula (2)

$$Tcl = K(\theta, N_1)(Ne - Nidl), \quad (2)$$

wherein "Tcl" represents the optimum torque, "K" represents the feed back gain, "$\theta$" represents the throttle opening, "$N_1$" represents the renewed meet revolution speed, "Ne" represents the actual engine revolution speed and "Nidl" represents the idle revolution speed.

After the seventh step "S7" a eighth step "S8" is conducted. The control voltage "Vcl" is determined in accordance with the relationships between the magnetizing current "Icl" and the optimum torque "Tcl" and the relationship between the control voltage "Vcl" and the magnetizing current "Icl" shown in FIG. 5 by the determined optimum torque "Tcl". And then, in a ninth step "S9" the control voltage "Vcl" is outputted. After the ninth step "S9", the second step "S2" is conducted.

Therefore, steps "S2" through "S9" are conducted continuously and circularly. As a result, the control voltage "Vcl" is outputted to the electro-magnetic particle clutch 16 in every circle or routine and the optimum torque "Tcl" of the electro-magnetic particle clutch 16 is controlled.

In the seventh step "S7", the value of the optimum torque "Tcl" may be determined by a following alternative third formula (3).

$$Tcl = Te(\theta, Ne) + K_1(Ne - N_1) + K_2 \int (Ne - N_1) dt \quad (3)$$

wherein "Te" represents the output torque of the engine 10, "$K_1$" represents a proportional control value (i.e., a feed back gain), "$K_2$" represents an integration control constant which has a substantially constant value, "θ" represents the throttle opening, "Ne" represents the actual engine revolution speed and "N₁" represents the meet revolution speed.

Figure 16:
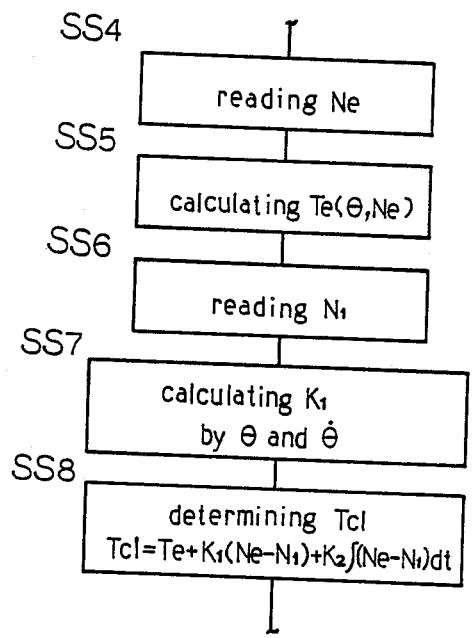
FIG. 16 is a flow chart illustrating alternative steps for steps "S4" through "S7" of FIG. 6.
Figure 17:
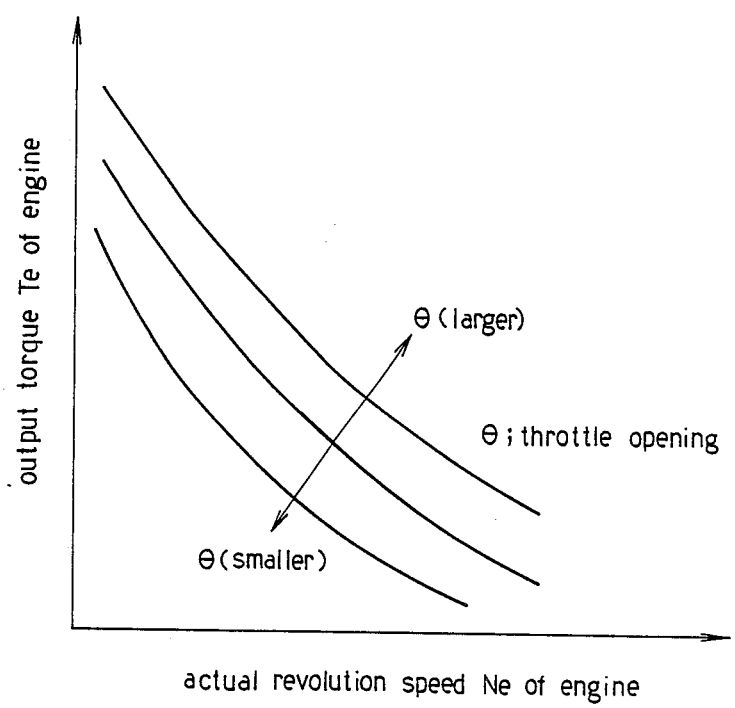
FIG. 17 is a graph showing relationships between output torque of the engine, actual engine revolution speed and throttle opening.
Figure 18:
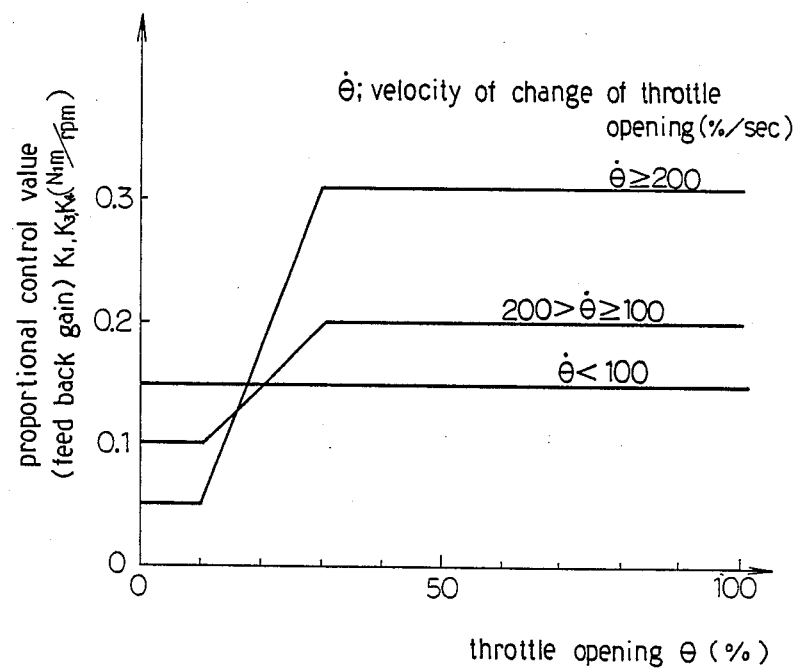
FIG. 18 is a graph showing relationships between a proportional control value, throttle opening and the velocity of change of the throttle opening.

When the above-mentioned formula (3) is employed, steps "SS4" through "SS8", which are shown in FIG. 16, are employed instead of the steps "S4" through "S7" shown in FIG. 6. In step "SS4" an actual engine revolution speed "Ne" at this point in time is read and in step "SS5" an engine torque "Te" is calculated in accordance with predetermined relationships between the detected throttle opening "θ" and the detected actual engine revolution speed "Ne". The predetermined relationships between throttle opening "θ", the actual engine revolution speed "Ne" and the output engine torque "Te", shown in FIG. 17, is previously memorized in a form of data maps in the ROM 54. After step "SS5", in step "SS6" the meet revolution speed "N₁", which is determined by the meet revolution speed setting device 62, is read. The meet revolution speed "N₁" is determined by the meet revolution speed "N₁" determining routine shown in FIG. 7. After step "SS6" in step "SS7" the proportional control value "K₄" (i.e., a feed back gain) is calculated in accordance with predetermined relationships, shown in FIG. 18, using the detected throttle opening "θ" and the calculated velocity of change "$\dot{\theta}$" of the throttle opening as parameters. Accordingly, when the velocity of change "$\dot{\theta}$" is smaller than 100%/sec the feed back gain "K₁" has a constant value (0.15 N m/rpm). When the velocity "$\dot{\theta}$" is equal to or larger than 100%/sec and the throttle valve is opened between 10% through 30%, the feed back gain "K₁" has a value proportional to the amount of the throttle opening "θ". The predetermined relationships between the proportional control value "K₁" (i.e., the feed back gain), the throttle opening "θ" and the velocity of change "$\dot{\theta}$" of the throttle opening are previously memorized in the form of a data map in the ROM 54. The integration control constant "K₂" is also memorized in the ROM 54. Then, in step "SS8", the optimum torque "Tcl", which should be controlled, is calculated in accordance with the above-mentioned formula (3) by the detected actual engine revolution speed "Ne", the determined meet revolution speed "N₁", the calculated first feed back gain "K₁", the integration control constant "K₂" and the calculated engine torque.

Further, it is apparent to those skilled in the art that the meet revolution speed "N₁" may be determined in accordance with either the detected throttle opening "θ" or the calculated velocity of change "$\dot{\theta}$" of the throttle opening "θ" instead of both the detected throttle opening "θ" and the calculated velocity of change "$\dot{\theta}$".

Figure 19A:
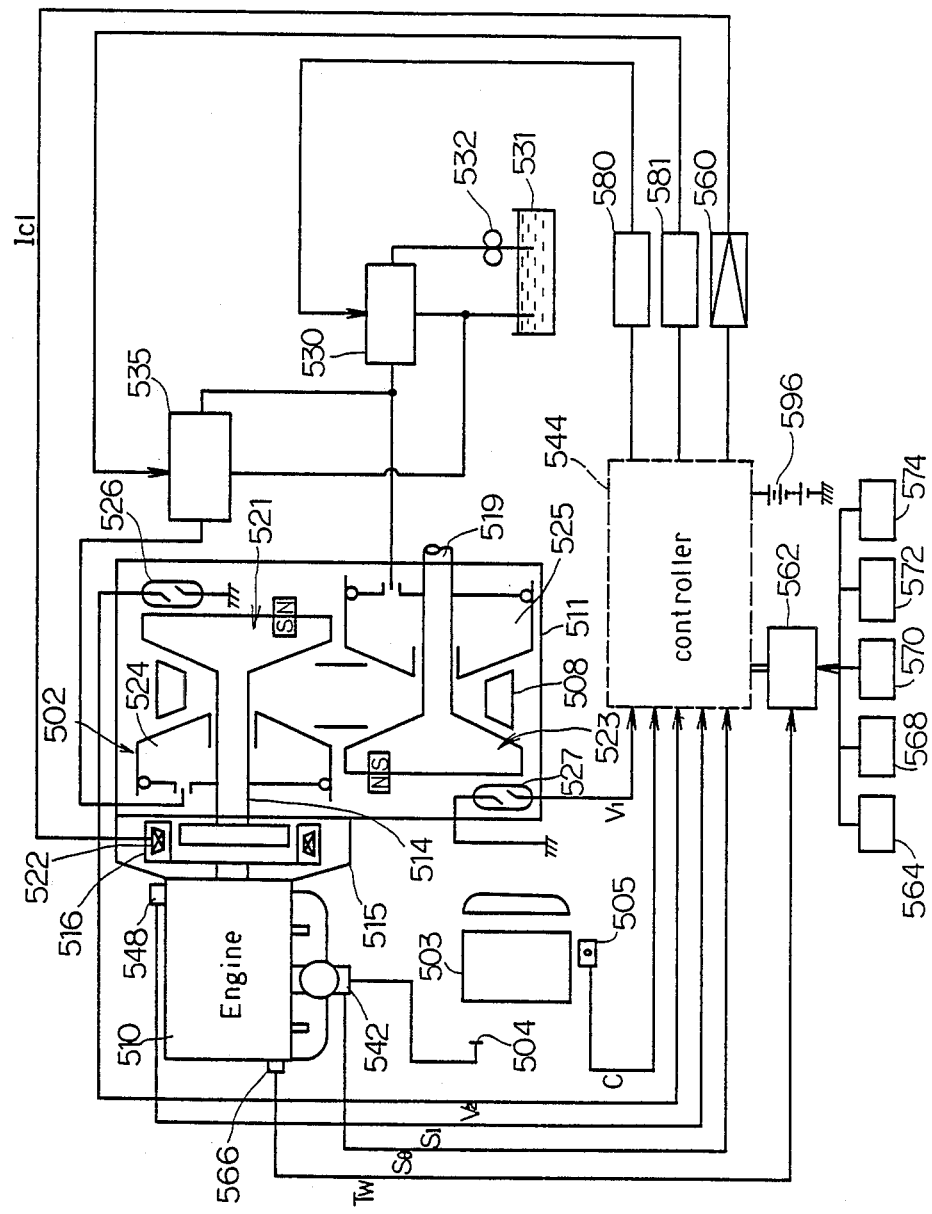
FIG. 19(A) is a schematic circuit illustrating a second embodiment of the present invention.
Figure 19B:
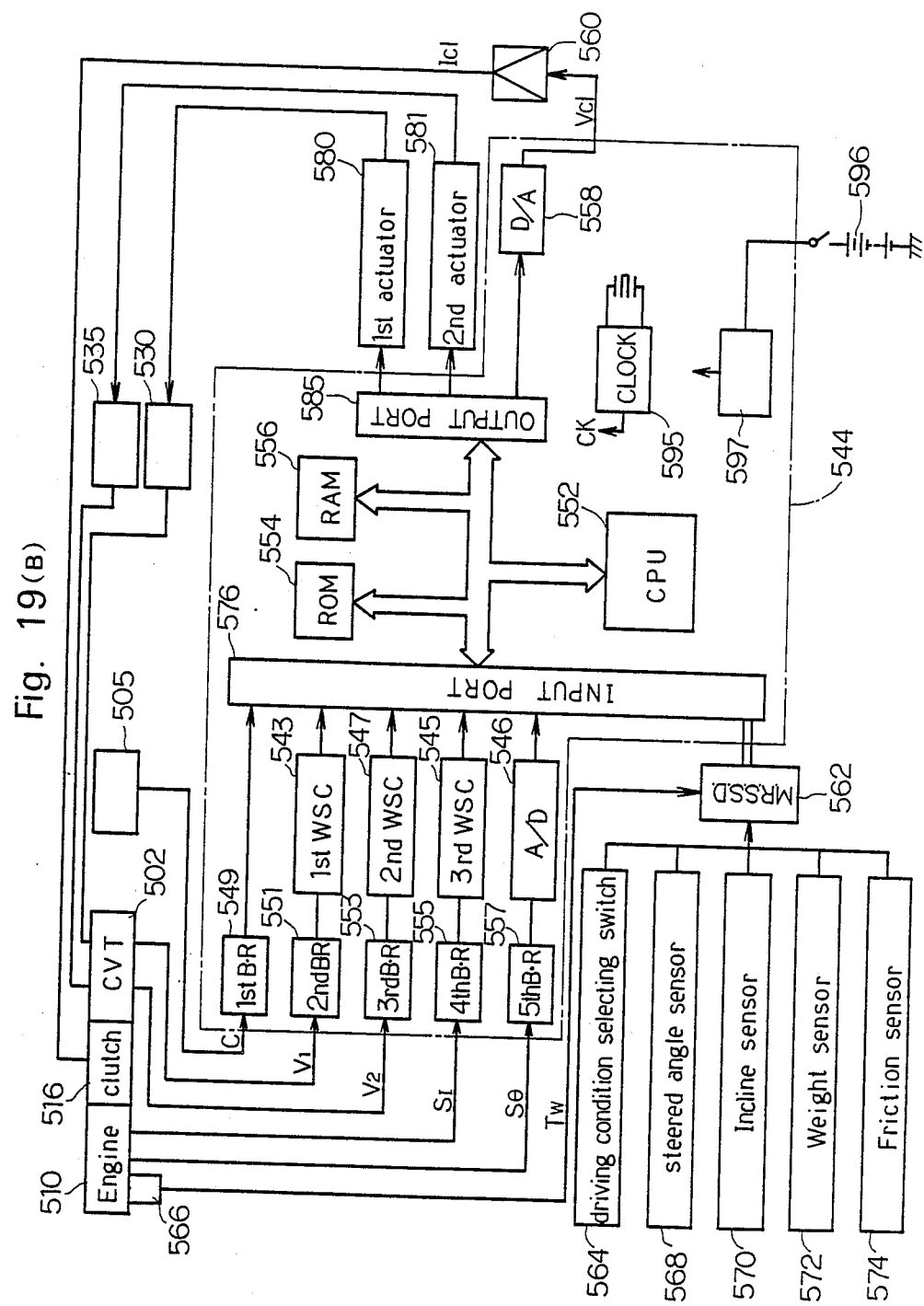
FIG. 19(B) is a block diagram of the second embodiment shown in FIG. 19(A)

FIG. 19 (A) through FIG. 27 (D) show a second embodiment according to the present invention.

The second embodiment further improves the method for controlling the electro-magnetic particle clutch of the first embodiment mentioned above.

As shown in FIGS. 19 (A) and 19 (B), an apparatus for controlling an electro-magnetic particle clutch of a vehicle, on which the second embodiment is employed, includes an engine 510, a continuously variable transmission 502 (hereinafter CVT), a seat 503, an acceleration pedal 504, and a shift position sensor 505. A throttle opening sensor 542, which comprises a potentio-meter, and an engine thermo-sensor 566 which detects the temperature of cooling water by a change in the electrical resistance of the cooling water, are mounted on the engine 510. The throttle opening sensor 542 detects the amount of throttle opening "θ" of a throttle valve (not shown in drawings) and outputs a signal "Sθ" to a controller 544. The shift position sensor 505 detects whether a shift lever (not shown in drawings) is positioned in a driving position and outputs a signal "C" to the controller 544. The engine thermo-sensor 566 outputs a signal "T_w" to a meet revolution speed setting device 562. An engine revolution speed sensor 548 is also mounted on the engine 510. The engine revolution speed sensor 548 detects an engine revolution speed (RPM) from signals outputted from an ignition circuit of the engine 510. The engine revolution speed sensor 548 outputs a signal "SI" to the controller 544.

The CVT 502 includes an input shaft 514, which is also an output shaft of an electro-magnetic particle clutch 516, an output shaft 519 of the CVT 502 and a housing 511 of the CVT 502. The electro-magnetic particle clutch 516, which is located between the engine 510 and the CVT 502, includes a magnetizing coil 522, which is located within an annular yoke thereof, and a housing 515 thereof. A structure of the electro-magnetic particle clutch 516 is the same as that in the first embodiment shown in FIG. 2.

The CVT 502 includes an input pulley 521 and an output pulley 523. The input pulley 521 is a driving pulley mounted on the driving and input shaft 514 which is driven by the engine 510 through the electro-magnetic particle clutch 516. The output pulley 523 is a driven pulley mounted on a driven and output shaft 519. The torque of the output shaft 519 is outputted to driving wheels (not shown in drawings). A torque transmitting continuous V-belt 508 extends between the input and output pulleys 521 and 523. The driving pulley 521 has a movable member which is axially displaced on and rotates with the input shaft 514, and a non-movable member, which is fixed to and rotates with the input shaft 514. The movable member is axially displaced by the pressure exerted upon it by a hydraulic cylinder 524. When the movable member is axially displaced in a direction toward the non-movable member, the width defined between the movable and non-movable members is decreased. The amount of oil applied to the cylinder 524 is controlled by a flow control valve 535. This results in an increase in the effective diameter of the driving pulley 521. As a result, the RPM ratio "e", (i.e., the rotational speed of the driven pulley 523/the rotational speed of the driving pulley 521, $N_{out}/N_{in}$) is increased. When the amount of oil released from the cylinder 524 through the flow control valve 535 is controlled, the RPM ratio "e" is decreased.

Similarly, the driven pulley 523 has a movable member, which is axially displaced on and rotates with the output shaft 519, and a non-movable member, which is fixed to and rotates with the output shaft 519. The movable member is axially displaced by pressure exerted upon it by a hydraulic cylinder 525. When the movable member is axially displaced in a direction toward the non-movable member, the width defined between the movable and non-movable members is decreased. This results in an increase in the effective diameter of the driven pulley 523.

To minimize the amount of engine power consumed by a hydraulic fluid pump 532, the hydraulic pressure in the cylinder 525 is controlled to be as small as possible while maintaining a torque necessary to prevent the belt 508 from slipping during rotation around the driving pulley 521 and the driven pulley 523. The hydraulic pressure of the cylinder 524 is varied to adjust the speed ratio "e". The amount of pressure in the hydraulic cylinder 524 is designed to be smaller than that of the hydraulic pressure in the hydraulic cylinder 525. However, even though the value of the hydraulic pressure applied to the hydraulic cylinder 524 is less than the value of the hydraulic pressure applied to the hydraulic cylinder 525, the system is designed so that a greater overall hydraulic pressure is realized in hydraulic cylinder 525 than in hydraulic cylinder 524. This is because a larger square is exerted upon hydraulic 524 by the hydraulic pressure than on the hydraulic cylinder 525. The CVT 502 is supplied with hydraulic fluid using the following procedure.

The hydraulic fluid pump 532, driven by a motor, pumps hydraulic fluid from a reservoir 531 to a pressure regulator valve 530. The pressure regulator valve 530 controls the pressure of the fluid applied to an oil passage by adjusting an amount of fluid released from the system, thereby generating a specific line pressure in the oil passage. The pressure regulator valve 530 supplies the line pressure through the oil passage to the hydraulic cylinder 525 of the driven pulley 523 and to the flow control valve 535. The flow control valve 535 is a three port connection valve, and includes an inlet port which is in communication with the oil passage, a drain port which is in communication with a drain passage and an outlet port which is in communication through an oil passage with the hydraulic cylinder 524 of the driving pulley 521. When the flow control valve 535 is in a first position, the inlet port communicates with the outlet port. When the flow control valve 535 is in a second position, there is no communication between the three ports. Finally, when the flow control valve 535 is in a third position, the outlet port communicates with the drain port. A check valve (not shown in drawings) is provided on the drain passage. The check valve only allows hydraulic fluid to flow in a single direction, from the flow control valve 535 to the hydraulic fluid reservoir 531.

An input pulley rotational speed detecting sensor 526 is located in the vicinity of the input pulley 521. The input pulley rotational speed detecting sensor 526 detects a rotational speed of the input pulley 521 by a magnet mounted on the non-movable member of the input pulley 521 and a lead switch. An output pulley rotational speed detecting sensor 527 is located in the vicinity of the output pulley 523. The output pulley rotational speed detecting sensor 527 detects a rotational speed of the output pulley 527 by a magnet mounted on the non-movable member of the output pulley 523 and a lead switch.

As shown in FIG. 19 (B), the controller 544 includes a first buffer resistor "1st BR" 549 through a fifth buffer resistor "5th BR" 557, a first waveform shaping circuit "1st WSC" 543, a second waveform shaping circuit "2nd WSC" 547 and a third waveform shaping circuit "3rd WSC" 545, an analog-to-digital converter "A/D" 546 and an input port 576. The first buffer resistor "1st BR" 549 receives the shift position signal "C" from the shift position sensor 505 and the first buffer 549 outputs a signal to the input port 576. The second buffer resistor "2nd BR" 551 receives an output pulley rotation speed signal "$V_1$" from the output pulley rotation speed sensor 527 and outputs a signal to the first waveform shaping circuit "1st WSC" 543 which outputs a shaped signal to the input port 576. The third buffer resistor "3rd BR" 553 receives an input pulley rotation speed signal "$V_2$" from the input pulley rotation speed sensor 526 and outputs a signal to the second waveform shaping circuit "2nd WSC" 547 which outputs a shaped signal to the input port 576. The fourth buffer resistor "4th BR" 555 receives the ignition signal "SI" from the ignitor 548 (i.e., a engine revolution speed detecting means) and outputs a signal to the third waveform shaping circuit "3rd WSC" 545 which outputs a shaped signal to the input port 576. The fifth buffer resistor "5th BR" 557 receives the throttle opening signal "$s\theta$" from the throttle opening sensor 542 and outputs a signal to the analog-to-digital converter "A/D" 546 which outputs a converted signal to the input port 576.

Further, the input port 576 receives an output signal from the meet revolution speed setting device "M.R.S.S.D." 562. The meet revolution speed setting device "M.R.S.S.D." 562 receives output signals from a driving condition selecting switch 564, the engine thermo-sensor 566, a steered angle sensor 568, an incline sensor 570, a weight sensor 572 and a friction sensor 574. The meet revolution speed setting device "M.R.S.S.D." 562, the driving condition selecting switch 564, the engine thermo-sensor 566, the steering angle sensor 568, the incline sensor 570, the weight sensor 572 and the friction sensor 574 have the same functions as their counterparts in the first embodiment.

The controller 544 also includes a central processing unit (hereinafter "CPU") 552, a read only memory (hereinafter "ROM") 554, a random access memory (hereinafter "RAM") 556 and an output port 585. The CPU 552, the ROM 554 and the RAM 556 have the same functions as their counterparts in the first embodiment. The output port 585 outputs signals to first and second actuators 580 and 581 and a digital-to-analog converter "D/A" 558. The digital-to-analog converter "D/A" 558 outputs a control voltage "Vcl" to an amplifier 560 and the amplifier 560 charges a magnetizing current "Icl" to the magnetizing coil 522 of the electro-magnetic particle clutch 516 proportional to the control voltage "Vcl". The first actuator 580 receives the signal from the output port 585 and outputs a signal to the pressure control valve 530 of the CVT 502. As a result, the pressure control valve 530 controls the pressure of the oil passage in accordance with the signal received. The second actuator 581 receives the signal from the output port 585 and outputs a signal to the flow control valve 535 of the CVT 502. As a result, the flow control valve 535 controls the flow of the oil to the hydraulic cylinder 524 of the input pulley 521 in accordance with the signal received.

Furthermore, the controller 544 includes a timing means 595, which outputs clock signals to elements of the controller 544, and an electric distributor 597 which supplies electric power from a battery 596 to the elements of the controller 544.

Figure 20:
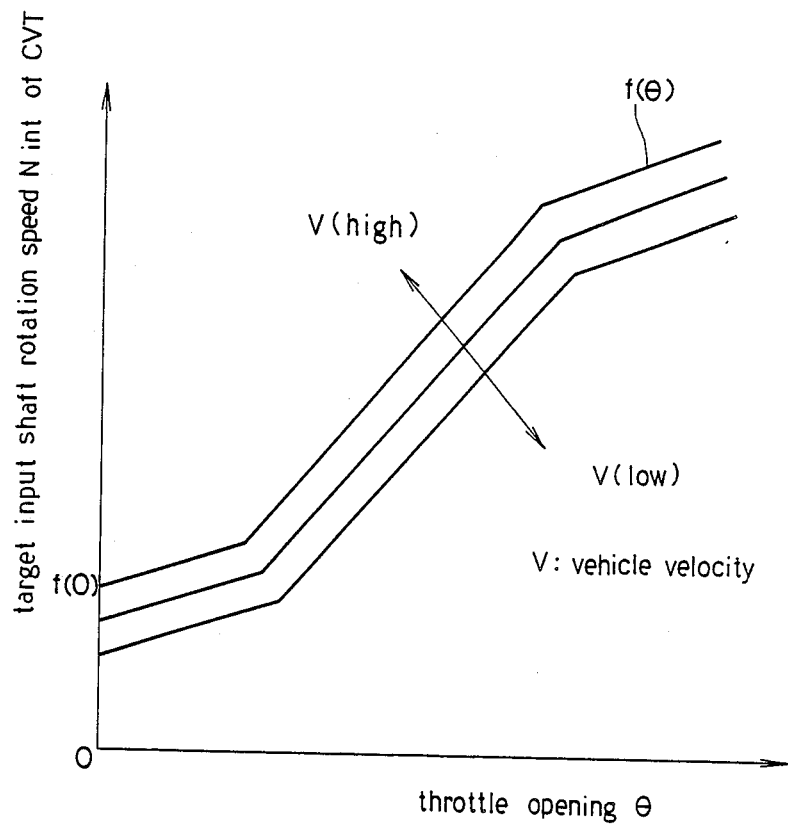
FIG. 20 is a graph showing relationships between the target input shaft rotation speed of CVT, vehicle velocity and the throttle opening.

Accordingly, the RPM ratio "e" (i.e., $N_{out}/N_{in}$) of the CVT 502 is controlled in accordance with relationships between throttle opening "$\theta$", target input shaft rotation speed "$N_{int}$" of the CVT 502 and velocity of the vehicle "V", which is shown in FIG. 20, and the signals outputted from the shift position sensor 505, the throttle opening sensor 542, the driving condition selecting switch 564, the engine thermo-sensor 566, the steering angle sensor 568, the incline sensor 570, the weight sensor 572, the friction 574, the ignitor 548, the output pulley rotational speed sensor 527 and the input pulley rotational speed sensor 526.

The operation of controlling the electro-magnetic particle clutch 516 of the second embodiment is described hereinafter.

Figure 21:
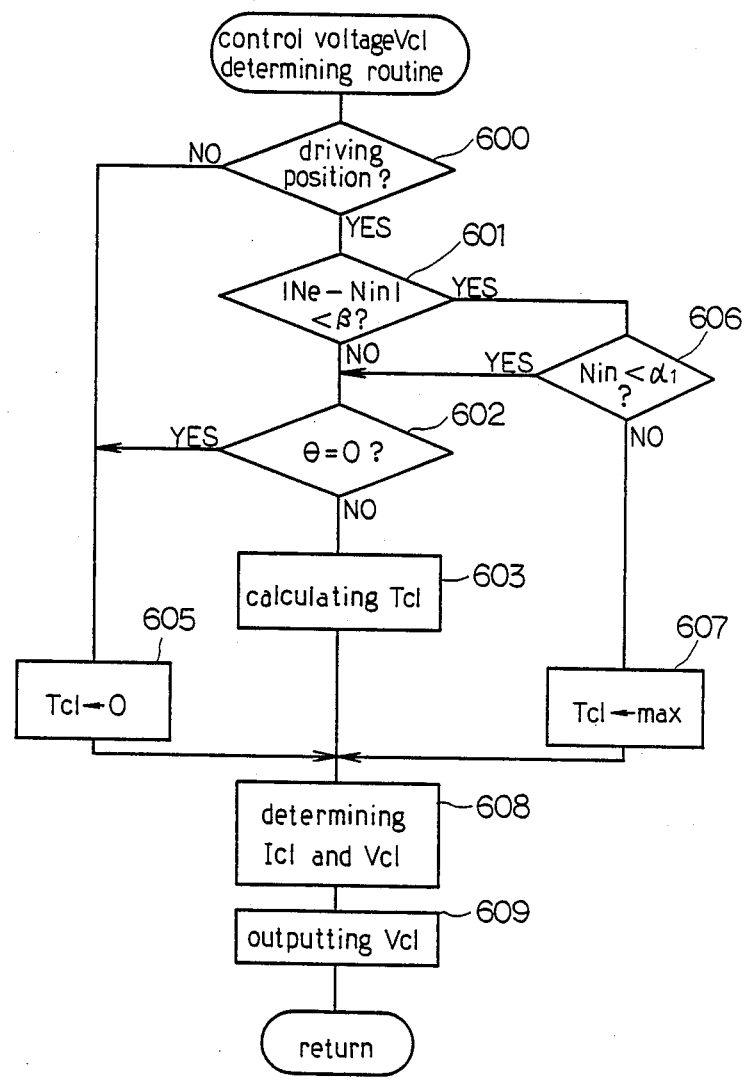
FIG. 21 is a flow chart illustrating a control voltage determining routine of the second embodiment.

First, as shown in FIG. 21, step 600 determines whether the shift lever is positioned in the driving position by the shift position signal "C" outputted from the shift position sensor 505. When the shift lever is not positioned in the driving position, step 605 is conducted. Step 605 determines a optimum torque "Tcl" to be "Zero", then no optimum torque "Tcl" is transmitted from the engine 510 to the CVT 502. On the other hand, when the shift lever is positioned at the driving position, step 601 is conducted.

Step 601 determines whether a predetermined value "$\beta$" is larger than an absolute value of a difference between the detected actual engine revolution speed "$N_e$" and the detected input shaft rotational speed "$N_{in}$" of the CVT 502. When the predetermined value "$\beta$" is larger than the absolute value of the difference, step 606 is conducted. On the other hand, when the predetermined value "$\beta$" is equal to or smaller than the absolute value of the difference, step 602 is conducted.

Step 602 determines whether the throttle valve is closed (i.e., whether an amount of the throttle opening "$\theta$" is Zero). When the throttle valve is closed, step 605 is conducted and as a result, no optimum torque "Tcl" is transmitted. On the other hand, when the throttle valve is not closed, step 603 is conducted.

Step 606 determines whether the detected input shaft rotational speed "$N_{in}$" of the CVT 502 is smaller than a predetermined rotational speed "$\alpha_1$". When the detected input shaft rotation speed "$N_{in}$" is smaller than the predetermined rotation speed "$\alpha_1$", step 602 is conducted. On the other hand, when the detected input shaft rotation speed "$N_{in}$" is not smaller than the predetermined rotation speed "$\alpha_1$" (i.e., the vehicle is driving), step 607 is conducted. Step 607 determines the optimum torque "Tcl" to be maximum, so that the optimum torque "Tcl" has a maximum value (i.e., almost all of the optimum torque "Tcl" is transmitted from the engine 510 to the CVT 502.) After one of the steps 603, 605 and 607 is conducted, step 608 is conducted. Step 608, determines a control voltage "Vcl" and a magnetizing current "Icl" from the calculated or determined optimum torque "Tcl" in accordance with previously memorized relationships which are the same as those of the first embodiment shown in FIG. 5. The relationships are previously memorized in the ROM 554. After step 608, step 609 is conducted. The step 609 outputs the control voltage "Vcl" to the amplifier 560 to control the electro-magnetic particle clutch 516. After step 609, step 600 is conducted again.

Therefore, steps 600 through 609 are conducted continuously and circularly. As a result, the control voltage "Vcl" is outputted to the electro-magnetic particle clutch 516 in every circle or routine and the optimum torque "Tcl" of the electro-magnetic particle clutch 516 is controlled.

Figure 22:
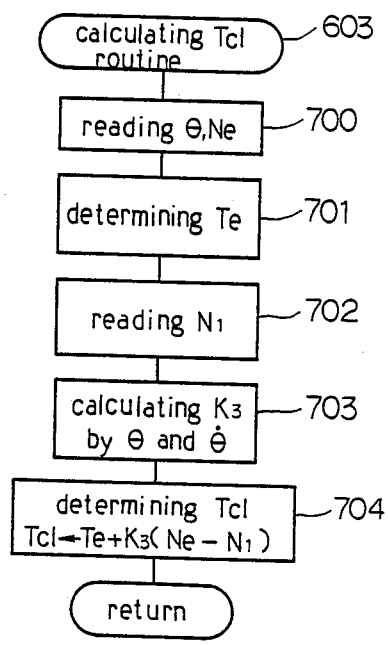
FIG. 22 is a flow chart illustrating a routine for calculating the optimum torque to be transmitted which is employed in the control voltage determining routine shown in FIG. 21.

FIG. 22 shows a routine 603 for calculating optimum torque "Tcl" in detail. First, step 700 reads the throttle opening "$\theta$" and the actual engine revolution speed "$N_e$" detected at this point. After step 700, step 701 is conducted. Step 701 determines an output torque "$T_e$" of the engine 510 in accordance with previously memorized relationships between the output torque "$T_e$" of the engine 501, the throttle opening "$\theta$" and the actual engine revolution speed "$N_e$". The relationships are the same as those in the first embodiment shown in FIG. 17 and the relationships are previously memorized in the ROM 554.

After step 701, step 702 is conducted. Step 702 reads the meet revolution speed "$N_1$" determined at this point in time. The meet revolution speed "$N_1$" is continually determined by the meet revolution speed setting device "M.R.S.S.D." 562. The meet revolution speed setting device "M.R.S.S.D." 562 repeatedly conducts a meet revolution speed "$N_1$" determining routine which is the same as that of the first embodiment shown in FIG. 7. Accordingly, the ROM 554 memorizes relationships which are the same as those of the first embodiment shown in FIGS. 8 through 14.

After step 702, step 703 is conducted. Step 703 calculates a feed back gain (i.e., a proportional control value) "$K_3$" in accordance with previously memorized relationships between the detected throttle opening "$\theta$" and a calculated velocity of change "$\dot{\theta}$" of the throttle opening. The relationships are the same as those of the first embodiment shown in FIG. 18 and the relationships are previously memorized in the form of a data-map or a function in the ROM 554.

After step 703, step 704 is conducted. Step 704 determines a value for the optimum torque "Tcl" using the following fourth formula (4):

$$Tcl = Te + K_3(N_e - N_1), \qquad (4)$$

wherein "Tcl" represents the optimum torque, "$K_3$" represents the feed back gain, "$N_1$" represents the meet revolution speed, and "$N_e$" represents the actual engine revolution speed. The fourth formula is memorized in the ROM 554.

After step 603 is conducted the steps 700 through 704 are conducted. As a result, the optimum torque "Tcl" is calculated.

Figure 23:
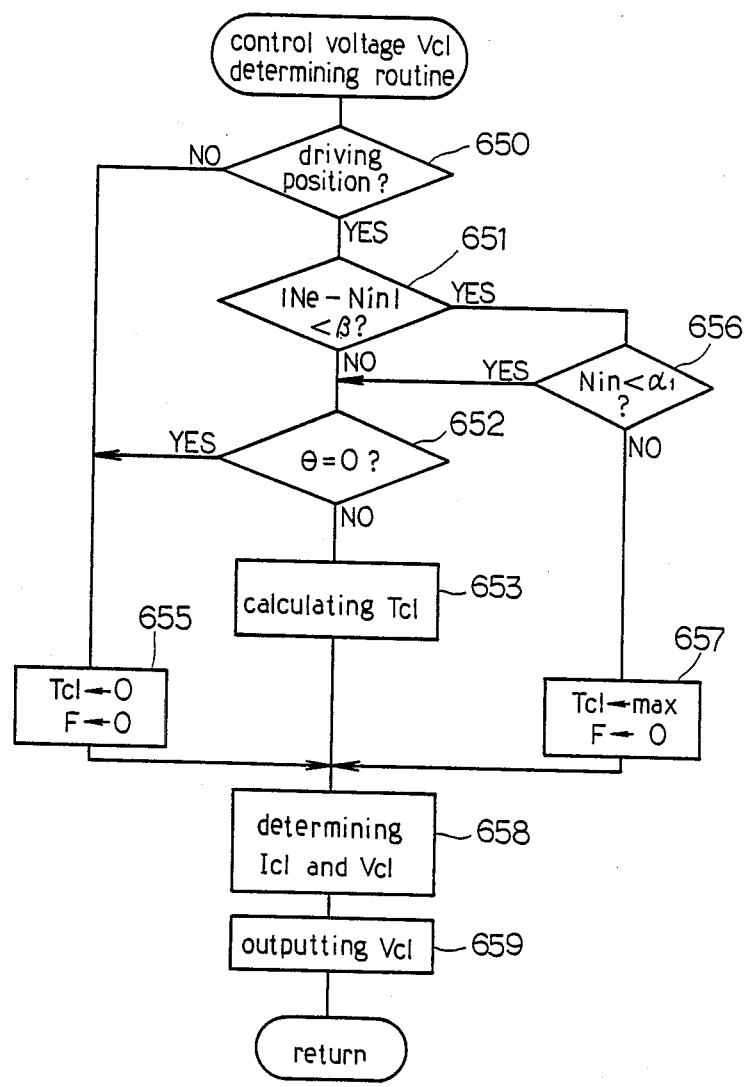
FIG. 23 is a flow chart illustrating an alternative control voltage determining routine which may be employed instead of the control voltage determining routine shown in FIG. 21.

Instead of the control voltage "Vcl" determining routine shown in FIG. 21, an alternative control voltage "Vcl" determining routine shown in FIG. 23 may be employed.

In the alternative control voltage "Vcl" determining routine, first step 650 determines whether the shift lever is not positioned at the driving position by the shift position signal "C" outputted from the shift position sensor 505. When the shift lever is not positioned at the driving position, step 655 is conducted. Step 655 determines the optimum torque to be "Zero", then no optimum torque is transmitted from the engine 510 to the CVT 502 and simultaneously, a flag "F" is reset (i.e., the flag "F" becomes Zero). On the other hand, when the shift lever is positioned at the driving position, step 651 is conducted.

Step 651 determines whether the predetermined value "$\beta$" is larger than an absolute value of a difference between the detected actual engine revolution speed "$N_e$" and the detected input shaft rotational speed "$N_{in}$" of the CVT 502. When the predetermined value "$\beta$" is larger than the absolute value of the difference, step 656 is conducted. On the other hand, when the predetermined value "$\beta$" is equal to or smaller than the absolute value of the difference, step 652 is conducted.

Step 652 determines whether the throttle valve is closed (i.e., whether a detected amount of the throttle opening "$\theta$" is Zero). When the throttle valve is closed, step 655 is conducted. As a result, no torque is transmitted. On the other hand, when the throttle valve is not closed, step 653 is conducted.

Step 656 determines whether the detected input shaft rotational speed "$N_{in}$" of the CVT 502 is smaller than the predetermined rotational speed "$\alpha_1$". When the input shaft rotational speed "$N_{in}$" is smaller than the predetermined rotational speed "$\alpha_1$", step 652 is conducted. On the other hand, when the input shaft rotational speed "$N_{in}$" is not smaller than the predetermined rotational speed "$\alpha_1$" (i.e., the vehicle is driving) step 657 is conducted. As a result, step 657 determines the optimum torque "Tcl" to be maximum, then the optimum torque "Tcl" has a maximum value (i.e., almost all of the torque) is transmitted from the engine 510 to the CVT 502), and simultaneously the flag "F" is reset (i.e., the flag "F" becomes Zero). After one of the steps 653, 655 and 657 is conducted a step 658 is conducted. Step 658 determines a control voltage "Vcl" and a magnetizing current "Icl" from calculated or determined optimum torque "Tcl" in accordance with the previously memorized relationships (which are the same as those of the first embodiment shown in FIG. 5). After step 658, step 659 is conducted. Step 659 outputs the control voltage "Vcl" to the amplifier 560 to control the electronic-magnetic particle clutch 516. After step 659, step 650 is conducted again.

Therefore, steps 650 through 659 are conducted continuously and circularly. As a result, the control voltage "Vcl" is outputted to the electro-magnetic particle clutch 516 in every circle or routine and the optimum torque "Tcl" of the electro-magnetic particle clutch 516 is controlled.

Figure 24:
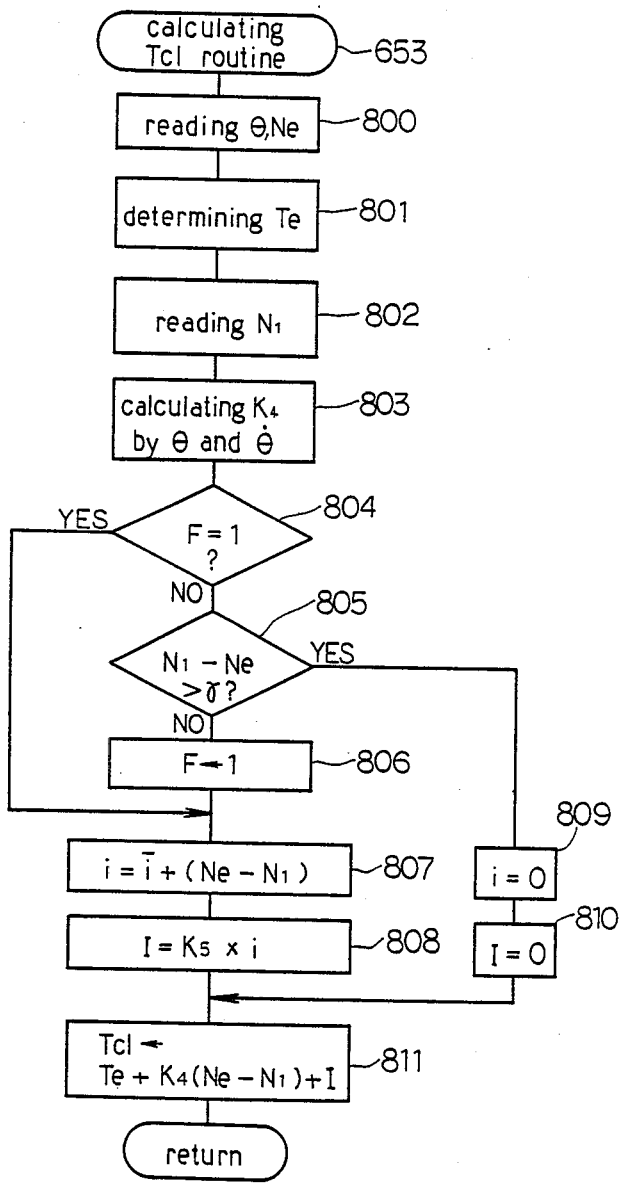
FIG. 24 is a flow chart illustrating a routine for calculating an optimum torque to be transmitted which is employed in the control voltage determining routine shown in FIG. 23.

FIG. 24 shows the calculating optimum torque "Tcl" routine 653 in detail. First, step 800 reads the throttle opening "$\theta$" and the actual engine revolution speed "$N_e$" detected at this point in time. After step 800, step 801 is conducted. Step 801 determines an output torque "$T_e$" of the engine 510 in accordance with a previously memorized relationship between the output torque "Te" of the engine 510, the throttle opening "$\theta$" and the actual engine revolution speed "Ne". The relationships are the same as those of the first embodiment shown in FIG. 21.

After step 801, step 802 is conducted. Step 802 reads the meet revolution speed "$N_1$", which is continuously determined by the meet revolution speed setting device "M.R.S.S.D." 562. The meet revolution speed setting device "M.R.S.S.D." 562 repeatedly conducts a meet revolution speed "$N_1$" determining routine which is the same as that of the first embodiment shown in FIG. 7.

After step 802, step 803 is conducted. Step 803 calculates a feed back gain (i.e., a proportional control value) "$K_4$" in accordance with previously memorized relationships between the velocity "$\dot\theta$" of the throttle opening, the feed back gain "$K_4$" and the throttle opening "$\theta$" by the detected throttle opening "$\theta$" and the calculated velocity of change "$\dot\theta$" of the throttle opening. The relationships are the same as those of the first embodiment shown in FIG. 18 and are memorized in the form of a data-map or a function in the ROM 554.

After step 803, step 804 is conducted.

Step 804 determines whether the flag "F" has been set (i.e., whether the flag "F" is "1"). When the flag "F" has been set, step 807 is conducted. On the other hand, when the flag "F" has not been set, step 805 is conducted. Step 805 determines whether a value obtained by subtracting the read actual engine revolution speed "$N_e$" from the read meet revolution speed "$N_1$" is larger than a second predetermined revolution speed "$\gamma$". When the subtracted value is larger than the second predetermined revolution speed "$\gamma$", step 809 is conducted. On the other hand, when the subtracted value is not larger than the predetermined revolution speed "$\gamma$", step 806 is conducted. Step 806 sets the flag "F", as a result, the flag "F" becomes "1". After step 806, step 807 is conducted. Step 807 calculates an integration value "i" in accordance with the following fifth formula (5).

$$i = \bar{i} + (N_e - N_1) \tag{5}$$

wherein "e,ovs/i/" represents a previously calculated integration value, "i" represents the integration value at this point in time, "$N_e$" represents the actual engine revolution speed and "$N_1$" represents the read meet revolution speed. The fifth formula is previously memorized in the ROM 554.

After step 807, step 808 is conducted. Step 808 calculates an integration value of the optimum torque "I" in accordance with the following sixth formula (6):

$$I = K_5 \times i, \tag{6}$$

wherein "I" represents the integration value of the optimum torque, "$K_5$" represents an integration control constant which has a substantially constant value and "i" represents the integration value. The sixth formula is previously memorized in the ROM 554.

Further, the step 809 clears the integration value "i" (i.e., the integration value "i" becomes "Zero") and then step 410 clears the integration value of the optimum torque "I" (i.e., the integration value of the optimum torque "I" becomes "Zero").

Accordingly, steps 809 and 810 clear the integration value "i" and the integration value of the optimum torque "I" continuously and circularly until step 805 determines that the subtraction value is equal to or smaller than the second predetermined revolution speed "$\gamma$".

After the step 805 determines that the subtraction value is not larger than the second predetermined revolution speed "$\gamma$", steps 807 and 808 calculate the integration value "i" and the integration value of the optimum torque "I" in accordance with the above-mentioned fifth and the sixth formulas continuously and circularly until steps 655 and 657, which are shown in FIG. 23, clear the flag "F" (i.e., the flag "F" becomes "Zero").

After one of steps 808, step 811 is conducted. Step 811 determines a value of the optimum torque "Tel", which should be controlled, in accordance with the following seventh formula (7):

$$Tcl = T_e + K_4(N_e - N_1) + I, \tag{7}$$

wherein "Tcl" represents the optimum torque, "Te" represents the determined emgine output torque, "$K_4$" represents the calculated feed back gain, "$N_1$" represents the determined meet revolution speed, "$N_e$" represents the actual engine revolution speed and "I" represents the calculated integration value of the optimum torque. The seventh formula is previously memorized in the ROM 554.

When step 653 is conducted, steps 800 through 811 are conducted. As a result, the optimum torque "Tcl" is calculated.

Figure 25:
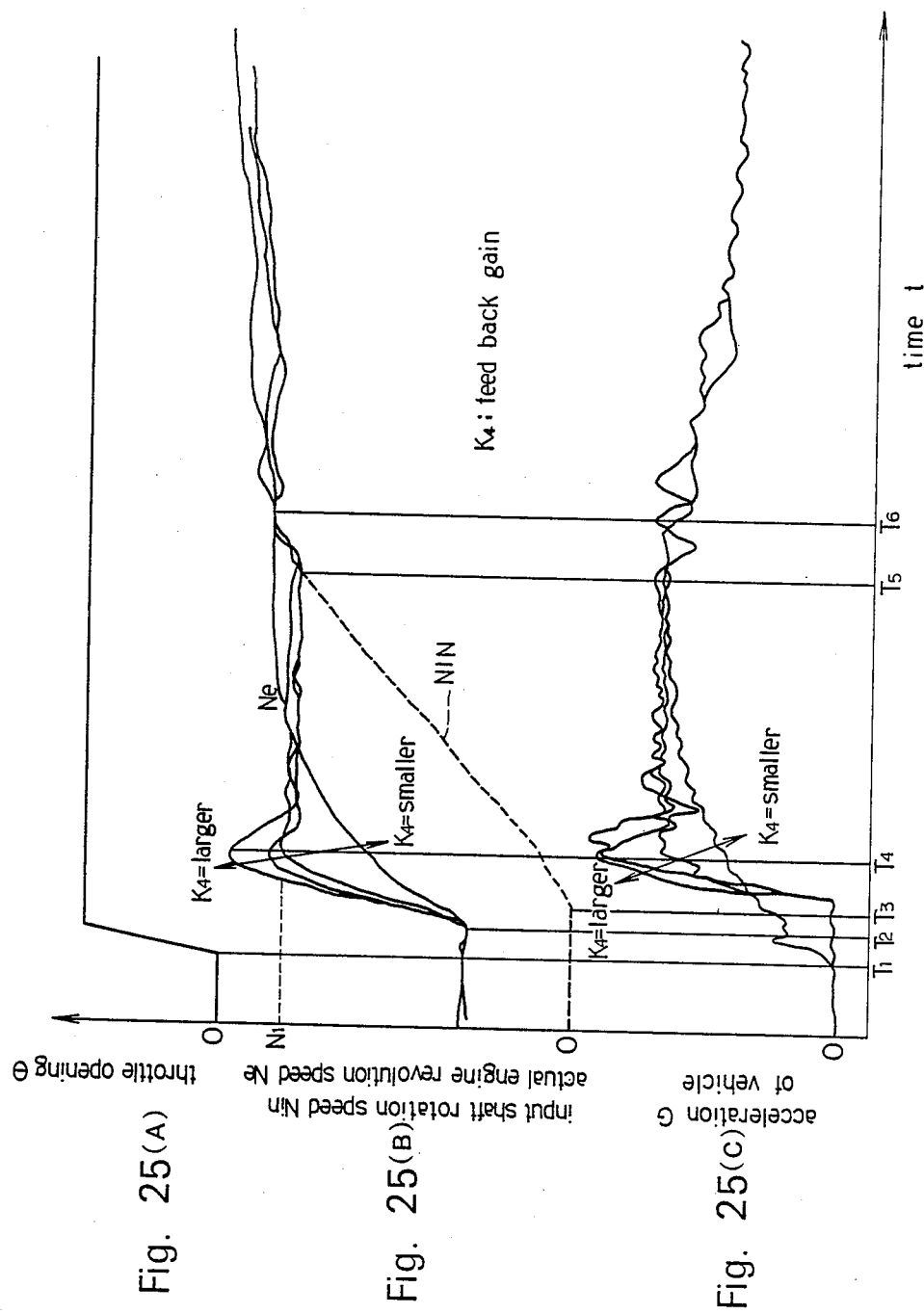
FIG. 25(A) is a graph showing a relationship between the throttle opening and time.
FIG. 25(B) is a graph showing relationships between an input shaft rotational speed of a continuously variable transmission, the feed back gain and time, and a relationship between an actual engine revolution speed and time as the throttle opening is changed according to FIG. 25(A)
FIG. 25(C) is a graph showing relationships between an acceleration of the vehicle, the feed back gain and time as the throttle opening is changed according to FIG. 25(A)

As shown in FIGS. 25 (A) through 25 (C), an operator displaces the acceleration pedal 504 (i.e., the throttle opening "θ" is changed) at a first point of time "$T_1$". At a second point in time "$T_2$", the actual engine revolution speed "$N_e$" starts increasing as shown in FIG. 25 (B), and the larger the feed back gain "$K_4$" is the larger the actual engine revolution speed "Ne" is between the second point of time "$T_2$" and a fourth point of time "$T_4$". At a third time "$T_3$", the electro-magnetic particle clutch 516 starts transmitting a torque from the engine 510 to the CVT 502 (i.e., the input shaft rotation speed "$N_{in}$" of the CVT 502 starts increasing). At the fourth point of time "$T_4$" the actual engine revolution speed "$N_e$" has a peak value when the feed back gain "$K_4$" is larger than a predetermined value. At a fifth point of time "$T_5$", the actual engine revolution speed "$N_e$" coincides with the input shaft rotation speed "$N_{in}$" of the CVT 502 when the feed back gain $K_4$ is larger than the predetermined value. At a sixth point of time "$T_6$", the actual engine revolution speed "$N_e$" coincides with the input shaft rotation speed "$N_{in}$" of the CVT 502 when the feed back gain "$K_4$" is smaller than the predetermined value.

As shown in FIGS. 25 (B) and 25 (C), the larger the feed back gain $K_4$ is, the steeper the peak of the actual engine revolution speed "$N_e$" and an acceleration "G" of the vehicle area. On the other hand, the smaller the feed back gain $K_4$ is, the gentler the peak of the actual engine revolution speed "$N_e$" and the acceleration "G" of the vehicle are.

Figure 26:
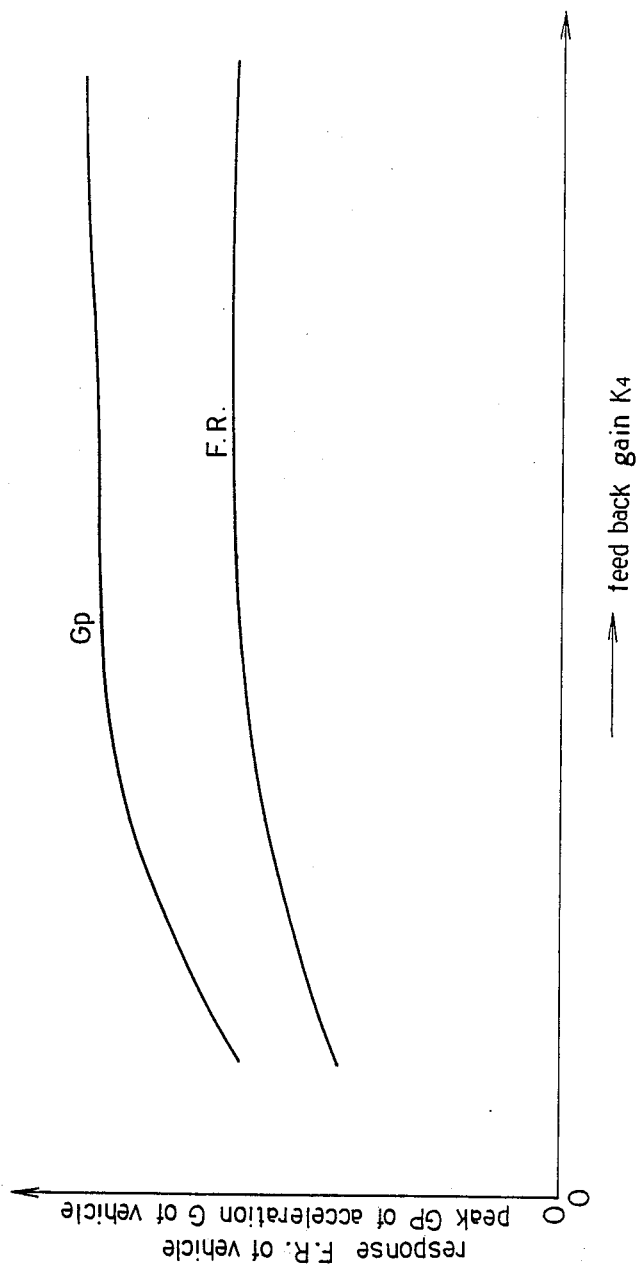
FIG. 26 is a graph showing a relationship between a response of the vehicle and the feed back gain and a relationship between peak acceleration of the vehicle and feed back gain.

Further, as shown in FIG. 26, the peak "GP" of the acceleration "G" and a response of the vehicle "F.R." are saturated (i.e., do not increase further) when the feed gack gain "$K_4$" is larger than a certain value.

Accordingly, when the shift lever is positioned at the driving position the vehicle starts driving in accordance with the broken lines shown in FIG. 25 (B) on the basis of the values of the feed back gain "$K_4$".

Further, as shown in FIGS. 27 (B) through 27 (D), when the routine for calculating optimum torque "Tcl" shown in FIG. 21 is employed, the actual engine revolution speed "$N_e$" the control voltage "Vcl" and an output shaft torque "T.Q" have values shown by broken lines. Accordingly, at a point of time "$T_{11}$", a full electric current is supplied to the electro-magnetic particle clutch 516 of the vehicle in which the calculating optimum torque "Tcl" routine shown in FIG. 21 is employed.

On the other hand, when the alternative routine for calculating optimum torque "Tcl" routine shown in FIG. 23 is employed, the actual engine revolution speed "$N_e$", the control voltage "Vcl" and the output shaft torque "T.Q" have values shown by the solid lines in FIGS. 27 (B) through 27(D). Accordingly, at a point of time "$T_{10}$", the full electric current is supplied to the electro-magnetic particle clutch 516 of the vehicle in which the alternative calculating optimum torque "Tcl" routine shown in FIG. 23 is employed.

Accordingly, when the vehicle employs the alternative optimum torque "Tcl" routine shown in FIG. 23, the actual engine revolution speed "$N_e$" coincides with the determined meet revolution speed "$N_1$" and the full electric current is supplied earlier than in the vehicle which employs the optimum torque "Tcl" routine shown in FIG. 21.

As described herein, the present invention overcomes the shortcomings of the known art by providing a meet revolution speed setting device for controlling an electro-magnetic clutch which can receive various signals indicating driving conditions and desires of an operator.

While the present invention has been described in its preferred embodiments, it is to be understood that the invention is not limited thereto, and may be otherwise embodied within the scope of the following claims.

What is claimed is:

1. An apparatus for controlling an electromagnetic particle clutch in a vehicle comprising:
    a first detecting means for detecting a throttle opening and for outputting a first detected signal;
    a memory means for memorizing seven relationships;
    a second detecting means for detecting an actual engine revolution speed and for outputting a second detected signal;
    processor means comprising first, second, third and fourth calculating means, and first, second and third determining means;
    said first calculating means for receiving the first and second detected signals and for calculating an engine torque utilizing a first of said seven relationships which uses the detected actual engine revolution speed and the detected throttle opening as parameters, the first calculating means outputting a first calculated signal;
    said second calculating means for receiving the first detected signal and for calculating a tentative revolution speed utilizing a second of said seven relationships which uses the detected throttle opening as a parameter, the second calculating means outputting a second calculated signal;
    a third detecting means comprising at least one detecting means for detecting at least one condition in which the vehicle begins moving and for outputting at least one of a plurality of third detected signals;
    said first determining means for receiving at least said third detected signal and for determining a total compensation value utilizing a plurality of third of said seven relationships, said plurality of third relationships using at least said third detected signal as a parameter, the first determining means outputting a first determined signal;
    said third calculating means for receiving said second calculated signal and said first determined signal and for calculating a desired revolution speed utilizing a fourth of said seven relationships, said fourth relationship using said calculated tentative revolution speed and said determined total compensation value as parameters, said third calculating means outputting a third calculated signal;
    said fourth calculating means for receiving the first detected signal, and for calculating a feed back gain utilizing a fifth of said seven relationships which uses the detected throttle opening as a parameter, the fourth calculating means outputting a fourth calculated signal;
    said second determining means for receiving the first, third and fourth calculated signals and the second detected signal, and for determining an optimum torque utilizing the sixth of said seven relationships which uses the calculated engine torque, the detected actual engine revolution speed, the calculated feed back gain and the calculated desired revolution speed as parameters, the second determining means outputting the second determined signal;
    said third determining means for receiving the second determined signal and for determining a control voltage utilizing a seventh of said seven relationships which uses at least the determined optimum torque as a parameter, the third determining means outputting the third determined signal; and a controlling means for receiving the third determined signal and for controlling electric current supplied to a magnetizing coil of the electro-magnetic particle clutch corresponding to the determined control voltage, whereby a torque transmitted from an engine to a transmission means by said electro-magnetic particle clutch is controlled utilizing at least one of the detected various conditions.

2. The apparatus of claim 1, wherein the sixth relationship is $$Tcl = Te + K(Ne - N_1)$$

wherein Tcl represents the optimum torque, Te represents the engine torque, K represents the feed back gain, Ne represents the actual engine revolution speed and $N_1$ represents the desired revolution speed.

3. The apparatus of claim 1, wherein the sixth relationship is $$Tcl = Te + K_1(Ne - N_1) + K_2(Ne - N_1)dt$$

wherein Tcl represents the optimum torque, Te represents the engine torque, $K_1$ represents the feed back gain, Ne represents the actual engine revolution speed, $N_1$ represents the desired revolution speed and $K_2$ represents a predetermined constant value.

4. The apparatus of claim 1, wherein the plurality of the third relationships comprises relationships numbered eighth through thirteenth, and wherein said third detecting means comprises fourth through ninth detecting means, said first determining means determining the total compensation value utilizing at least one of the eighth through thirteenth relationships using one of a fourth through ninth detected signal outputted from at least one of the fourth through ninth detecting means.

5. The apparatus of claim 4, wherein:

said eighth relationship relates to a first compensation value having one of first, second and third and first, second and third driving conditions, the first compensation values corresponding to one of first, second and third driving conditions, said fourth detecting means detecting at least one of the first, second or third driving conditions, and outputting the fourth detected signal, whereby when the fourth detecting means detects the first driving condition the fourth detected signal is outputted from the fourth detecting means corresponding to a first value, when the fourth detecting means detects the second driving condition the fourth detected signal is outputted corresponding to a second value, and when the fourth detecting means detects the third driving condition the fourth detected signal is outputted corresponding to a third value;

the ninth relationship relates to a second compensation value and a temperature of the engine;

the fifth detecting means detects the temperature of the engine and outputs said fifth detected signal;

the tenth relationship relates to a third compensation value and a steering angle of a steering wheel, the sixth detecting means detecting the steering angle and outputting said sixth detected signal;

the eleventh relationship relates to a fourth compensation value and an incline of a road on which the vehicle begins moving, the seventh detecting means detecting the incline of the road and outputting the seventh detecting signal;

the twelfth relationship relates to a fifth compensation value and a weight of the vehicle, the eighth detecting means detecting the weight of the vehicle and outputting the eighth detecting signal; and the thirteenth relationship relates to a sixth compensation value and a friction coefficient of the road on which the vehicle begins moving, the ninth detecting means detecting the friction coefficient of the road and outputting the ninth detecting signal.

6. The apparatus of claim 1, said processor means further comprising a fifth calculating means for receiving the first detected signal and for calculating a rate of change of the throttle opening, the fifth calculating means outputting a fifth calculated signal.

7. The apparatus of claim 6, wherein the second calculating means receives the first detected signal and the fifth calculated signal and the second calculating means calculates the tentative revolution speed using the detected throttle opening and the calculated rate of change of the throttle opening as parameters.

8. The apparatus of claim 6, wherein the fourth calculating means receives the first detected signal and the fifth calculated signal and the fourth calculated means calculates the feed back gain using the detected throttle opening and the calculated rate of change of the throttle opening as parameters.

9. A method for controlling an electromagnetic particle clutch in a vehicle comprising the steps of:

detecting a throttle opening and outputting a first detected signal corresponding to the detected throttle opening;

detecting an actual engine revolution speed and outputting a second detected signal corresponding to the detected actual engine revolution speed;

calculating an engine torque after receiving the first and second detected signals utilizing a first set of relationships which use the detected actual engine revolution speed and the detected throttle opening as parameters and then outputting a first calculated signal which indicates said calculated engine torque;

calculating a tentative revolution speed after receiving the first detected signal utilizing a second set of relationships which use the detected throttle opening, and then outputting a second calculated signal having said calculated tentative desired revolution speed;

detecting at least one of a plurality of driving conditions in which the vehicle begins moving and outputting at least one of a plurality of detected signals indicating at least one of the detected plurality of conditions;

determining a total compensation value after receiving said at least one of the plurality of detecting signals utilizing a set of third relationships which uses at least one of the detected plurality of conditions as a parameter, and then outputting a first determined signal which is indicative of the determined total compensation value;

calculating a desired revolution speed after receiving the second calculated signal, said calculating being performed utilizing a fourth relationship between the calculated tentative revolution speed and the determined total compensation value, and then outputting a third calculating signal which is indicative of the calculated desired revolution speed;

calculating a feed back gain after receiving the first detected signal utilizing a set of fifth relationships, which uses the detected throttle opening as a parameter, and then outputting a fourth calculated signal which indicates the calculated feed back gain;

determining an optimum torque after receiving the first, third and fourth calculated signals and the second detected signal utilizing a sixth relationship which uses the calculated engine torque, the detected actual engine revolution speed, the calculated feed back gain and the calculated desired revolution speed as parameters, and then outputting a second determined signal which indicates determined optimum torque;

determining a control voltage after receiving the second determined signal utilizing a seventh relationship which uses the determined optimum torque as a parameter, and then outputting a third determined signal which is indicative of said determined control voltage; and controlling electric current supplied to a magnetizing coil of the electro-magnetic particle clutch after receiving the third determined signal, said controlling being performed to correspond to the determined control voltage, whereby an optimum torque of the electro-magnetic particle clutch is controlled in accordance with at least one of the detected various condition.

10. The method of claim 9, wherein the sixth relationship is $$Tcl = Te + K(Ne - N_1)$$

wherein Tcl represents the optimum torque, Te represents the engine torque, K represents the feed back gain, Ne represents the actual engine revolution speed and $N_1$ represents the desired revolution speed.

11. The method of claim 9, wherein the sixth relationship is $$Tcl = Te + K_1(Ne - N_1) + K_2 \int (Ne - N_1) dt$$

wherein Tcl represents the optimum torque, Te represents the engine torque, $K_1$ represents the feed back gain, Ne represents the actual engine revolution speed, $N_1$ represents the desired revolution speed and $K_2$ represents a predetermined constant value.

12. The method of claim 9, wherein said set of third relationships comprises eighth through thirteenth relationships, and wherein said detecting of at least one of a plurality of conditions comprises fourth through ninth detecting steps and wherein the first determining step determines the total compensation value utilizing at least one of said eighth through thirteenth relationships which uses at least one of fourth through ninth detected signals outputted from at least one of the fourth through ninth detecting steps.

13. The method of claim 12, wherein:

said eighth relationship relates to a first compensation value and first through third of said plurality of driving conditions, said first compensation value having on of a first, second and third value which is indicative of said first, second and third driving conditions, respectively, said fourth detecting means detects one of said first through third driving conditions, and outputs the fourth detected signal, whereby when the fourth detecting means detects the first driving condition the fourth detected signal corresponding to the first value is outputted from the fourth detecting means, when the fourth detecting means detects the second driving condition the fourth detected signal corresponding to the second value is outputted, and when the fourth detecting means detects the third driving condition the fourth detected signal corresponding to the third value is outputted;

said ninth relationship relates to a second compensation value and a temperature of the engine, the fifth detecting means detecting the temperature of the engine and outputting the fifth detected signal;

said tenth relationship relates to a third compensation value and a steering angle of a steering wheel, the sixth detecting means detecting said steering angle and outputting the sixth detected signal;

said eleventh relationship relates to a fourth compensation value and an incline of a road on which the vehicle starts driving, said seventh detecting means detecting the incline of the road and outputting the seventh detecting signal;

said twelfth relationship relates to a fifth compensation value and a weight of the vehicle, the eighth detecting means detecting the weight of the vehicle and outputting the eighth detected signal; and said thirteenth relationship relates to a sixth compensation value and a friction coefficient of the road on which the vehicle starts driving, said ninth detecting means detecting the friction coefficient of the road and outputting the ninth detecting signal.

14. The method of claim 9, further comprising calculating a rate of change of the throttle opening during the starting operation of the vehicle by using the detected throttle opening, said calculating of said rate of change being performed after receiving the first detected signal, and outputting a fifth calculating signal which is indicative of said rate of change of the throttle opening.

15. The method of claim 14, wherein said calculating the tentative revolution speed is performed by receiving the first detected signal and the fifth calculated signal and calculating the tentative revolution speed by the detected throttle opening and the calculated rate of change of the throttle opening.

16. The method of claim 14, wherein said calculating of the tentative revolution speed is performed by receiving the first detected signal and the fifth calculating signal and calculating the feed back gain by using the detected throttle opening and the calculated rate of change of the throttle opening.

17. An apparatus for controlling an electromagnetic particle clutch in a vehicle comprising:

a memory means for memorizing first through seventh relationships;

a first detecting means for detecting an actual engine revolution speed and for outputting a first detected signal;

a second detecting means for detecting a throttle opening and for outputting a second detected signal;

processor means comprising first, second, third, fourth and fifth determining means and first, second, third and fourth calculating means;

said first determining means for receiving the second detected signal and for determining whether the detected throttle opening is larger than a predetermined value, the first determining means outputting a first determined signal when the detected throttle opening is larger than the predetermined value;

said first calculating means for receiving the second detected signal and for calculating a rate of change of the throttle opening when the vehicle begins moving, the first calculating means outputting a first calculated signal;

said second determining means for receiving the first determined signal, the first calculated signal and the second detected signal and for determining a tentative revolution speed utilizing said first relationships, said first relationship being between the calculated rate of change of the throttle opening and the detected throttle opening when the second determining means receives the first determined signal, the second determining means outputting a second determined signal;

a third detecting means for detecting at least one of a plurality of conditions in which the vehicle begins moving and for outputting at least one of a plurality of detected signals;

said third determining means for receiving at least one of the plurality of detected signals and for determining a total compensation value utilizing said second relationship, said second relationship including at least one of the detected plurality of conditions as a parameter, the third determining means outputting a third determined signal;

said second calculating means for receiving the second determined signal and the third determined signal and for calculating a desired revolution speed utilizing said third relationship, said third relationship being between the calculated tentative revolution speed and the determined total compensation value, the second calculating means outputting a second calculated signal;

said third calculating means for receiving the second detected signal and the first calculated signal, said third calculating means calculating the feed back gain utilizing said fourth relationships, said fourth relationship being between said detected throttle opening and the calculated rate of change of the throttle opening, the third calculating means outputting a third calculated signal;

said fourth calculating means for receiving the first and second detected signals and for calculating an engine torque utilizing said fifth relationship, said fifth relationship being between the detected actual engine revolution speed and the detected throttle opening, the fourth calculating means outputting a fourth calculated signal;

said fourth determining means for receiving said second, third and fourth calculated signals and the first detected signal, and for determining an optimum torque to be transmitted utilizing said sixth relationship, said sixth relationship being between the calculated engine torque, the detected actual engine revolution speed, the calculated feed back gain and the calculated desired revolution speed, the fourth determining means outputting a fourth determined signal;

said fifth determining means for receiving said fourth determined signal and for determining a control voltage utilizing said seventh relationship which includes the determined optimum torque as a parameter, the fifth determining means outputting the fifth determined signal; and a controlling means for receiving the fifth determined signal and for controlling electric current supplied to a magnetizing coil of the electro-magnetic particle clutch corresponding to the determined control voltage, whereby an optimum torque of the electro-magnetic particle clutch is controlled corresponding to at least one of the detected plurality of conditions.

18. The apparatus of claim 17, wherein:

said second relationships comprises eighth through thirteenth relationships, the third detecting means comprises fourth through ninth detecting means and the third determining means determines the total compensation value utilizing at least one of the eighth through thirteenth relationships using at least one of fourth through ninth detected signals outputted from at least one of the fourth through ninth detecting means, said eighth relationships relating to a first compensation value and first through third of said plurality of driving conditions, said first compensation value having one of a first, second and third value which is indicative of a first, second and third driving condition, respectively;

said fourth detecting means detects one of said first through third driving conditions and outputs the fourth detected signal, whereby when the fourth detecting means detects the first driving condition the fourth detected signal corresponding to the first value is outputted from the fourth detecting means, when the fourth detecting means detects the second driving condition the fourth detected signal corresponding to the second value is outputted and when the fourth detecting means detects the third driving condition the fourth detected signal corresponding to the third value is outputted;

said ninth relationship relates to a second compensation value and a temperature of the engine, the fifth detecting means detecting the temperature of the engine and outputs the fifth detected signal;

said tenth relationship relates to a third compensation value and a steering angle of a steering wheel, the sixth detecting means detecting the steering angle and outputting the sixth detected signal;

said eleventh relationship relates to a fourth compensation value and an incline of a road on which the vehicle begins moving, the seventh detecting means detecting the incline of the road and outputting the seventh detecting signal;

said twelfth relationship relates to a fifth compensation value and a weight of the vehicle, the eighth detecting means detecting the weight of the vehicle and outputting the eighth detected signal; and said thirteenth relationship relates to a sixth compensation value and a friction coefficient of the road on which the vehicle starts driving, the ninth detecting means detecting the friction coefficient of the road and outputting the ninth detecting signal.

19. The apparatus of claim 18, wherein the sixth relationship is $$Tcl = Te + K_1(Ne - N_1) + K_2(Ne - N_1)dt$$

wherein Tcl represents the optimum torque, Te represents the engine torque, $K_1$ represents the feed back gain, Ne represents the actual engine revolution speed, $N_1$ represents the desired revolution speed and $K_2$ represents a predetermined constant value.

20. The apparatus of claim 19, wherein when the first determining means determines that the detected throttle opening is not larger than the predetermined value, the first determining means further determines the optimum torque is "Zero", and no torque is transmitted from the engine to the transmission means.

21. A method for controlling an electromagnetic particle clutch in a vehicle comprising steps of:

detecting an actual engine revolution speed and outputting a first detected signal which is indicative of the detected actual engine revolution speed;

detecting a throttle opening and outputting a second detected signal corresponding to the detected throttle opening;

determining whether a detected throttle opening is larger than a predetermined value, and then outputting a first determined signal when the detected throttle opening is larger than the predetermined value, said determination being performed after receiving said second detected signal;

calculating a rate of change of the throttle opening when starting the vehicle utilizing the detected throttle opening and then outputting a first calculated signal, said calculating being performed after receiving the second detected signal;

determining a tentative revolution speed utilizing first relationships, said first relationships being between the calculated rate of change of the throttle opening and the detected throttle opening when the second determining means receives the first determined signal, the first calculated signal and the second detected signal, and then outputting a second determined signal;

detecting at least one of a plurality of conditions in which the vehicle begins moving and outputting at least one of a plurality of detected signals which is indicative of at least one of the detected various conditions;

determining a total compensation value utilizing second relationships using at least one of the detected plurality of conditions and then outputting a third determined signal corresponding to the determined total compensation value, said determining of a total compensation value being performed after receiving at least one of the plurality of detected signals;

calculating a desired revolution speed utilizing a third relationship after receiving said second and third determined signals, said third relationship being between the calculated tentative revolution speed and the determined total compensation value, and outputting a second calculated signal having the calculated desired revolution speed;

calculating the feed back gain utilizing fourth relationships, after receiving the second detected signal and the first calculated signal, and then outputting a third calculated signal, said fourth relationships being between the detected throttle opening and the calculated rate of the change of the throttle opening;

calculating an engine torque utilizing fifth relationships between the detected actual engine revolution speed and the detected throttle opening after receiving the first and second detected signals, and then outputting a fourth calculated signal which is indicative of the calculated engine torque;

determining an optimum torque utilizing a sixth relationship between the calculated engine torque, the detected actual engine revolution speed, the calculated feed back gain and the calculated desired revolution speed, said detecting of said optimum torque being performed after receiving the second through fourth calculated signals and the first detected signal, and outputting the fourth determined signal which is indicative of the optimum torque;

determining a control voltage in accordance with a seventh relationship which includes the determined optimum torque as a paratmeter, said control voltage determination being performed after receiving the fourth determined signal, and outputting the fifth determined signal having the determined control voltage; and controlling electric current supplied to a magnetizing coil of the electro-magnetic particle clutch corresponding to the determined control voltage after receiving the fifth determined signal, whereby the torque transmitted by the electro-magnetic particle clutch is controlled to be the optimum with respect to at least one of the detected plurality of conditions.

22. The method of claim 21, wherein:

said second relationships comprise eighth through thirteenth relationships, the third detecting step comprises fourth through ninth detecting means and the third determining step determines the total compensation value utilizing at least one of the eighth through thirteenth relationships, said at least one of the eighth through thirteenth relationships including at least one of fourth through ninth detected signals outputted from at least one of the fourth through ninth detecting steps as a parameter, said eighth relationship relating to a first compensation value and first through third driving conditions, the first compensation value having one of first, second and third values corresponding to one of the first, second and third driving conditions, the fourth detecting means detecting one of the first through third driving conditions and outputting the fourth detected signal, whereby when the fourth detecting means detects said first driving condition the fourth detected signal corresponding to said first value is outputted from the fourth detecting means, when the fourth detecting means detects the second driving condition the fourth detected signal corresponding to the second value is outputted, and when the fourth detecting means detects the third driving condition the fourth detected signal corresponding to the third value is outputted;

said ninth relationship relates to a second compensation value and a temperature of the engine, the fifth detecting means detecting the temperature of the engine and outputting the fifth detected signal;

said tenth relationship relates to a third compensation value and a steering angle of a steering wheel, said sixth detecting means detecting the steering angle and outputting the sixth detected signal;

said eleventh relationship relates to a fourth compensation value and an incline of a road on which the vehicle starts driving, the seventh detecting means detecting the incline of the road and outputting the seventh detecting signal;

said twelfth relationship relates to a fifth compensation value and a weight of the vehicle, the eighth detecting means detecting the weight of the vehicle and outputting the eighth detecting signal; and said thirteenth relationship relating to a sixth compensation value and a friction coefficient of the road on which the vehicle begins moving, the ninth detecting means detecting the friction coefficient of the road and outputting the ninth detecting signal.

23. The method of claim 22, wherein the sixth relationship is $$Tcl = Te + K_1(Ne - N_1) + K_2 \int (Ne - N_1) dt$$

wherein Tcl represents said optimum torque, Te represents the engine torque, $K_1$ represents the feed back gain, Ne represents the actual engine revolution speed, $N_1$ represents the desired revolution speed and $K_2$ represents a predetermined constant value.

24. The method of claim 23, wherein when the first determining step determines that the detected throttle opening is not larger than the predetermined value, th first determining step further determines the optimum torque to be "Zero".

25. An apparatus for controlling an electromagnetic particle clutch in a vehicle comprising:
a first detecting means for detecting whether a shift lever is positioned at a driving position and for outputting a first detected signal when the shift lever is positioned at the driving position;
a memory means for memorizing a set of first through a set of seventh relationships;
a second detecting means for detecting an actual engine revolution speed and for outputting a second detected signal;
a third detecting means for detecting an input shaft revolution speed of a transmission means, and for outputting a third detected signal;
processor means comprising first through fifth determining means and first through fifth calculating means;
said first determining means for receiving said first and second detected signals and for determining whether a first predetermined value is larger than an absolute value of a difference between the detected actual engine revolution speed and the detected input shaft revolution speed when the shift lever is positioned at the driving position, the first determining means outputting a first determined signal when the first predetermined value is not larger than the absolute value of the difference;
a fourth detecting means for detecting a throttle opening and for outputting a fourth detected signal;
said second determining means for receiving the fourth detected signal and the first determined signal and for determining whether the detected throttle opening is smaller than a second predetermined value, the second determining means outputting a second determined signal when the detected throttle opening is not smaller than the second predetermined value;
said first calculating means for receiving said second and fourth detected signals and the second determined signal and for calculating an engine torque utilizing said first set of relationships, said first set of relationships being between the detected actual engine revolution speed and the detected throttle opening, said engine torque calculation being performed when the first calculating means receives the second determined signal, the first calculating means outputting a first calculated signal;
said second calculating means for receiving the fourth detected signal and for calculating a rate of change of the throttle opening when the vehicle begins moving utilizing the detected throttle opening, the second calculating means outputting a second calculated signal;
said third calculating means for receiving the fourth detected signal and the second calculated signal and for calculating a tentative revolution speed utilizing the second relationship, said second relationship being between the detected throttle opening and the calculated rate of change of the throttle opening, the third calculating means outputting a third calculated signal;
a fifth detecting means for detecting at least one of a plurality of conditions in which the vehicle begins moving and for outputting at least one of a plurality of detected signals;
said third determining means for receiving said at least one of the plurality of detected signals and for determining a total compensation value utilizing said set of the third relationships using at least one of the detected plurality of conditions as a parameter, the third determining means outputting a third determined signal;
said fourth calculating means for receiving the third calculated signal and the third determined signal and for calculating a desired revolution speed utilizing said fourth relationship, said fourth relationship being between the calculated tentative revolution speed and the determined total compensation value, the fourth calculating means outputting a fourth calculated signal;
said fifth calculating means for receiving the fourth detected signal and the second calculated signal and for calculating a feed back gain utilizing the fifth relationship, said fifth relationship being between the detected throttle opening and the calculated rate of the change of the throttle opening, the fifth calculating means outputting a fifth calculated signal;
said fourth determining means for receiving the first, fourth and fifth calculated signals and the second detected signal, and for determining an optimum torque utilizing the sixth relationship, said sixth relationship being between the calculated engine torque, the detected actual engine revolution speed, the calculated feed back gain and the calculated desired revolution speed, the fourth determining means outputting a fourth determined signal;
said fifth determining means for receiving the fourth determined signal and for determining a control voltage utilizing the seventh relationship using the determined optimum torque as a parameter, the fifth determining means outputting the fifth determined signal; and
a controlling means for receiving the fifth determined signal and for controlling electric current supplied to a magnetizing coil of the electro-magnetic particle clutch utilizing the determined control voltage, whereby a torque transmitted from an engine to a transmission means by the electro-magnetic particle clutch is controlled using at least one of the detected various conditions to be the optimum torque.

26. The apparatus of claim 25, wherein the sixth relationship is $$Tcl = Te + K_1(Ne - N_1) + I$$

wherein Tcl represents the optimum torque, Te represents the engine torque, $K_1$ represents the feed back gain, Ne represents the actual engine revolution speed, $N_1$ represents the desired revolution speed and I represents an integration value of the optimum torque.

27. The apparatus of claim 26, further comprising:
a sixth detecting means for detecting whether a flag is set and for outputting a sixth detected signal when the flag is set;
said processing means further including sixth and seventh calculating means, said sixth calculating means for receiving the second and sixth detected signals and the fourth calculated signal and for calculating an integration value utilizing a fourteenth relationship, said fourteenth relationship having the previously calculated and memorized integration value and the detected revolution speed as parameters, the sixth calculating means outputting a sixth calculated signal; and
said seventh calculating means for receiving the sixth calculated signal and for calculating the integration value of the optimum torque utilizing a fifteenth relationship between the calculated integration value and the predetermined constant value, whereby the optimum torque is determined by the calculated integration value of the optimum torque, the calculated engine torque, the calculated feed back gain, the detected actual engine revolution speed and the calculates desired revolution speed.

28. The apparatus of claim 27, wherein when the sixth detecting means detects that the flag is not set, the sixth detecting means further determines whether a subtraction of the calculated desired revolution speed from the detected actual engine revolution speed is larger than a fourth predetermined value, whereby when the sixth detecting means determines that the subtraction is not larger than the fourth predetermined value the flag is set and the sixth calculating means calculates the integration value.

29. The apparatus of claim 28, wherein when the sixth detecting means detects that the flag is not set and that the subtraction is larger than the fourth predetermined value, the sixth detecting means further determines the integration value of the optimum torque to be "Zero".

30. The apparatus of claim 25, wherein the sixth relationship is $$Tcl = Te + K(Ne - N_1)$$

wherein Tcl represents the optimum torque, Te represents the engine torque, K represents the feed back gain, Ne represents the actual engine revolution speed and $N_1$ represents the desired revolution speed.

31. The apparatus of claim 30, wherein:
said third set of relationships comprises eighth through thirteenth relationships, said fifth detecting means comprises sixth through eleventh detecting means and the third determining means determines the total compensation value utilizing at least one of the eighth through thirteenth relationships which has at least one of sixth through eleventh detecting means as a parameter, said eighth relationship relating to a first compensation value and first through third driving conditions, the first compensation value having one of a first, second and third value corresponding to one of the first, second and third driving conditions, the sixth detecting means detecting one of the first through third driving conditions, and outputting the sixth detected signal, whereby when the sixth detecting means detects the first driving condition the sixth detected signal corresponding to the first value is outputted from the sixth detecting means, when the sixth detecting means detects the second driving condition the sixth detected signal corresponding to the second value is outputted, and when the sixth detecting means detects the third driving condition the sixth detected signal corresponding to the third value is outputted;
said ninth relationship relates to a second compensation value and a temperature of the engine, the seventh detecting means detecting the temperature of the engine and outputting the seventh detected signal;
said tenth relationship relates to a third compensation value and a steering angle of a steering wheel, the eighth detecting means detecting the steering angle and outputting the eighth detected signal;
said eleventh relationship relates to a sixth compensation value and an incline of a road on which the vehicle begins moving, said ninth detecting means detecting the incline of the road and outputting the ninth detecting signal;
said twelfth relationship relates to a fifth compensation value and a weight of the vehicle, the eighth detecting means detecting the weight of the vehicle and outputting the tenth detected signal; and
said thirteenth relationship relates to a tenth compensation value and a friction coefficient of the road on which the vehicle begins moving, said eleventh detecting means detecting the friction coefficient of the road and outputting the eleventh detecting signal.

32. The apparatus of claim 31, wherein when the first detecting means detects that the shift lever is not positioned at the driving position, the first detecting means further determines optimum torque is "Zero", whereby torque is transmitted from the engine to the transmission means.

33. The apparatus of claim 31, wherein when the second determining means determines that the detected throttle opening is smaller than the second predetermined value, the second determining means further determines the optimum torque to be "Zero".

34. The apparatus of claim 31, wherein when the first determining means determines that the first predetermined value is larger than the absolute value of the difference, the first determining means further determines whether the detected input shaft revolution speed is smaller than a third predetermined value, whereby when the first determining means determines that the detected input shaft revolution speed is smaller than the third predetermined value the second determining means determines whether the detected throttle opening is smaller than the second predetermined value.

35. The apparatus of claim 34, wherein when the first determining means determines that the first predetermined value is larger than the absolute value of the difference and the detected input shaft revolution speed is not smaller than the third predetermined value, the first determining means further determines the optimum torque to be a maximum, so that almost all of the engine torque is transmitted to the transmission means.

36. A method for controlling an electro-magnetic particle clutch in a vehicle comprising the steps of:

detecting whether a shift lever is positioned at a driving position and outputting a first detected signal when the shift lever is positioned at the driving position;

detecting an actual engine revolution speed and outputting a second detected signal corresponding to the the detected actual engine revolution speed;

detecting an input shaft revolution speed of a transmission means, and outputting a third detected signal;

determining whether a first predetermined value is larger than an absolute value of a difference between the detected actual engine revolution speed and the detected input shaft revolution speed after receiving the first through third detected signals, and then outputting a first determined signal when the first predetermined value is not larger than the absolute value of the difference;

detecting a throttle opening and outputting a fourth detected signal using the detected throttle opening;

determing whether a detected throttle opening is smaller than a second predetermined value by the detected throttle opening after receiving the fourth detected signal and the first determined signal, and then outputting a second determined signal when the detected throttle opening is not smaller than the second predetermined value;

calculating an engine torque utilizing a set of first relationships between the detected actual engine revolution speed and the detected throttle opening, said calculating being performed after receiving the second and fourth detected signals and the second determined signal, and then outputting a first calculated signal which is indicative of the calculated engine torque;

calculating a rate of change of the throttle opening during the starting operation of the vehicle using the detected throttle opening, said calculation of the rate of change being performed after receiving the fourth detected signal, and then outputting a second calculating signal which is indicative of the calculated rate of change of the throttle opening;

calculating a tentative revolution speed in accordance with a second set of relationships between the detected throttle opening and the calculated rate of change of the throttle opening, said tentative revolution speed calculation being performed after receiving said fourth detected signal and the second calculated signal, and then outputting a third calculated signal;

detecting at least one of a plurality of conditions in which the vehicle begins moving and outputting at least one of a plurality of detected signals indicating at least one of the detected plurality of conditions;

determining a total compensation value utilizing said set of third relationships which include at least one of the detected various conditions as a parameter, said total compensation value determination being performed after receiving at least one of the plurality of detected signals, and then outputting a third determined signal having the determined total compensation value;

calculating a desired revolution speed utilizing a fourth relationship between the calculated tentative revolution speed and the determined total compensation value, said desired revolution speed calculation being performed after receiving the third calculated signal and the third determined signal, and then outputting a fourth calculated signal corresponding to the calculated desired revolution speed;

calculating a feed back gain utilizing a fifth relationship between the detected throttle opening and the calculated rate of change of the throttle opening, said feed back gain calculation being performed after receiving the fourth detected signal and the second calculated signal, and then outputting a fifth calculated signal;

determining an optimum torque utilizing a sixth relationship between the calculated engine torque, the detected actual engine revolution speed, the calculated feed back gain and the calculated desired revolution speed, said optimum torque determination being performed after receiving the first, fourth and fifth calculated signals and the second detected signal, and then outputting a fourth determined signal which is indicative of the determined optimum torque;

determining a control voltage utilizing a fourth relationship using the optimum torque as a parameter, said control voltage determination being performed after receiving the fourth determined signal, and then outputting the fifth determined signal corresponding to the determined control voltage; and controlling electric current supplied to a magnetizing coil of the electro-magnetic particle clutch corresponding to the determined control voltage after receiving the fifth determined signal, whereby a torque transmitted by the electro-magnetic particle clutch from an engine to a transmission means is controlled using at least one of the detected plurality of conditions.

37. The method of claim 36, wherein the sixth relationship is $$Tcl = Te + K_1(Ne - N_1) + I$$

wherein Tcl represents the optimum torque, Te represents the engine torque, $K_1$ represents the feed back gain, Ne represents the actual engine revolution speed and $N_1$ represents the desired revolution speed and I represents a first integration value of the optimum torque.

38. The method of claim 37, further comprising steps of:

detecting whether a flag is set and outputting a sixth detected signal when the flag is set;

calculating a second integration value utilizing a fourteenth relationship, said fourteenth relationship being between the first integration value, the detected revolution speed and the fourth calculated signal, and then outputting a sixth calculated signal; and calculating a third integration value of the optimum torque utilizing a fifteenth relationship, said fifteenth relationship being between the by the calculated integration value and the predetermined constant value after receiving the sixth calculated signal, whereby the optimum torque is determined by the third calculated integration value of the optimum torque, the calculated engine torque, the calculated feed back gain, the detected actual engine revolution speed and the calculated desired revolution speed.

39. The method of claim 38, wherein when the sixth detecting step detects that the flag is not set, and that a subtraction of the calculated desired revolution speed from the detected actual engine revolution speed is larger than a fourth predetermined value, the flag is set and the sixth calculating step calculates the integration value.

40. The method of claim 39, wherein when the sixth detecting step detects that the flag is not set and that the subtraction is larger than the fourth predetermined value, the sixth detecting step further determines the integration value of the optimum torque to be "Zero".

41. The method of claim 36, wherein the sixth relationship is $$Tcl = Te + K(Ne - N_1)$$

wherein Tcl represents the optimum torque, Te represents the engine torque, K represents the feed back gain, Ne represents the actual engine revolution speed and $N_1$ represents the desired revolution speed.

42. The method of claim 41, wherein:
said third relationships comprise eighth through thirteenth relationships, the fifth detecting step comprises sixth through eleventh detecting steps and the third determining step determines the total compensation value utilizing at least one of the eighth through thirteenth relationships using at least one of sixth through eleventh detected signals outputted from at least one of the sixth through eleventh detecting steps as a parameter, said eighth relationship relating to a first compensation value and first, second or third driving condition, the first compensation value having one of a first, second and third value corresponding to one of the first, second and third driving conditions, the sixth detecting means detecting one of the first through third driving conditions, and outputting a sixth detected signal, whereby when the sixth detecting means detects the first driving condition the sixth detected signal corresponding to the first value is outputted from the sixth detecting means, when the sixth detecting means detects the second driving condition the sixth detected signal corresponding to the second value is outputted, and when the sixth detecting means detects the third driving condition the sixth detected signal corresponding to the third value is outputted;
said ninth relationship relates to a second compensation value and a temperature of the engine, the seventh detecting means detecting the temperature of the engine and outputting the seventh detected signal;
said tenth relationship relates to a third compensation value and a steering angle of a steering wheel, the eighth detecting means detecting the steering angle and outputting the eighth detected signal;
said eleventh relationship relates to a fourth compensation value and an incline of a road on which the vehicle begins moving, the ninth detecting means detecting the incline of the road and outputting the ninth detected signal;
said twelfth relationship relates to a fifth compensation value and a weight of the vehicle, the tenth detecting means detecting the weight of the vehicle and outputting the tenth detected signal; and
said thirteenth relationship relates to a sixth compensation value and a friction coefficient of the road on which the vehicle begans moving, the eleventh detecting means detecting the friction coefficient of the road and outputting the ninth detecting signal.

43. The method of claim 42, wherein when the first detecting step detects that the shift lever is not positioned in the driving position, the first detecting step further determines the optimum torque to be "Zero".

44. The method of claim 42, wherein when the second determining step determines that the detected throttle opening is smaller than the second predetermined value, the second determining step further determines the optimum torque to be "Zero".

45. The method of claim 42, wherein when the first determining step determines that the first predetermined value is larger than said absolute value of said difference, the first determining step further determines whether the detected input shaft revolution speed is smaller than a third predetermined value, whereby when the first determining step determines that the detected input shaft revolution speed is smaller than the third predetermined value the second determining step determines whether the detected throttle opening is smaller than the second predetermined value.

46. The method of claim 45, wherein when the first determining step determines that the first predetermined value is larger than the absolute value of the difference and the detected input shaft revolution speed is not smaller than the third predetermined value, the first determining step further determines the optimum torque to have a maximum value, whereby almost all of the engine torque is transmitted to the transmission means.

47. An apparatus for controlling an electro-magnetic particle clutch in a vehicle comprising:
a memory means for memorizing a first set of relationships through a sixth set of relationships;
a first detecting means for detecting an idle revolution speed of an engine and an actual engine revolution speed, the first detecting means outputting an idle signal and an engine revolution signal;
a second detecting means for detecting a throttle opening and for outputting a second detected signal;
processor means comprising first, second, third and fourth determining means, and first, second and third calculating means;
a first calculating means for receiving the second detected signal and for calculating a rate of the change of the throttle opening during a starting operation of the vehicle using the detected throttle opening, the first calculating means outputting a first calculated signal;
a first determining means for receiving the second detected signal and the first calculated signal and for determining a tentative revolution speed utilizing said first set of relationships between the calculated rate of change of the throttle opening and the detected throttle opening, the first determining means outputting a determined signal;

a third detecting means for detecting at least one of a plurality of conditions in which the vehicle begins moving and for outputting at least one of a plurality of detected signals;

a second determining means for receiving said at least one of the plurality of detected signals and for determining a total compensation value utilizing said second set of relationships using at least one of the detected various conditions as a parameter, the second determining means outputting a second determined signal;

a second calculating means for receiving the first determined signal and the second determined signal and for calculating a desired revolution speed utilizing a third relationship between the determined tentative revolution speed and the determined total compensation value, the second calculating means outputting a second calculated signal;

a third calculating means for receiving the engine revolution signal and the second calculated signal and for calculating a feed back gain utilizing said fourth set of relationships between the detected throttle opening and the calculated desired revolution speed, the third calculating means outputting a third calculated signal;

a third determining means for receiving the idle signal, the engine revolution signal and the third calculated signal and for determining an optimum torque utilizing said fifth set of relationships between the detected actual engine revolution speed, the calculated feed back gain and the detected idle revolution speed, the third determining means outputting a third determined signal;

a fourth determining means for receiving the third determined signal and for determining a control voltage utilizing said sixth set of relationships which includes the determined optimum torque as a parameter, and for outputting a fourth determined signal; and a means for receiving the fourth determined signal and for controlling electric current supplied to a magnetizing coil of the electro-magnetic particle clutch corresponding to the determined control voltage, whereby a torque of the electro-magnetic particle clutch, transmitted from an engine to a transmission means is controlled using at least one of the detected various conditions to have an optimum torque.

48. The apparatus of claim 47, wherein:

said second set of relationships comprises seventh through twelfth relationships, the third detecting means comprises fourth through ninth detecting means, and the second determining means determines the total compensation value utilizing at least one of the seventh through twelfth relationships including fourth through ninth detecting means as parameters, said seventh relationship relating to a first compensation value and first, second and third driving conditions, the first compensation value having one of a first, second and third values corresponding to one of the first, second and third driving conditions;

the fourth detecting means detects one of the first through third driving conditions, and outputs the fourth detected signal, whereby when the fourth detecting means detects the first driving condition the fourth detected signal corresponding to the first value is outputted from the fourth detecting means, when the fourth detecting means detects the second driving condition the fourth detected signal corresponding to the second value is outputted, and when the fourth detecting means detects the third driving condition the fourth detected signal corresponding to the third value is outputted;

said eighth relationship relates to a second compensation value and a temperature of the engine, the fifth detecting means detecting the temperature of the engine and outputting the fifth detected signal;

said ninth relationship relates to a third compensation value and a steering angle of a steering wheel, the sixth detecting means detecting the steering angle and outputting the sixth detected signal;

said tenth relationship relates to a fourth compensation value and an incline of a road on which the vehicle starts driving, the seventh detecting means detecting the incline of the road and outputting the seventh detecting signal;

said eleventh relationship relates to a fifth compensation value and a weight of a vehicle, the eighth detecting means detecting the weight of the vehicle and outputting the eighth detecting signal; and said twelfth relationship relates to a sixth compensation value and a friction coefficient of the road on which the vehicle begins moving, said ninth detecting means detecting the friction coefficient of the road and outputting the ninth detecting signal.

49. A method for controlling an electro-magnetic particle clutch in a vehicle comprising the steps of:

detecting an idle revolution speed of an engine and an actual engine revolution speed, and outputting an idle signal, which is indicative of the detected idle revolution speed, and an engine revolution signal, which is indicative of the detected actual engine revolution signal;

detecting a throttle opening and outputting a second detected signal which is indicative of the detected throttle opening;

calculating a rate of a change of the throttle opening during a starting operation of the vehicle using the detected throttle opening after receiving the second detected signal, and then outputting a first calculated signal which is indicative of the calculated rate of change of the throttle opening;

determining a tentative revolution speed utilizing a first set of relationships using the calculated rate of change of the throttle opening and the detected throttle opening as parameters, said determination being performed after receiving the second detected signal and the first calculated signal, and then outputting a first determined signal having the determined tentative revolution speed;

detecting at least one of a plurality of conditions in which the vehicle begins moving and outputting at least one of a plurality of detected signals which is indicative of the plurality of detected conditions;

determining a total compensation value utilizing a set of second relationships using at least one of the detected plurality of conditions as a parameter, said total compensation value determination being performed after receiving at least one of the plurality of detected signal, and outputting a second determined signal which is indicative of the determined total compensation value;

calculating a desired revolution speed utilizing a third relationship which uses the determined tentative revolution speed and the determined total compensation value as parameters, said desired revolution speed calculation being performed after receiving the first determined signal and the second determined signal, and then outputting a second calculated signal which is indicative of the calculated desired revolution speed;

calculating a feed back gain utilizing a set of fourth relationships which use the detected throttle opening and the calculated desired revolution speed as parameters, said feed back gain calculation being performed after receiving the engine revolution signal and the second calculated signal, and then outputting a third calculated signal which is indicative of the calculated feed back gain;

determining an optimum torque utilizing a fifth relationship which uses the detected actual engine revolution speed, the calculated feed back gain and the detected idle revolution speed as parameters, said optimum torque determination being performed after receiving the idle signal, the engine revolution signal and the third calculated signal, and then outputting a third determined signal which is indicative of the determined optimum torque;

determining a control voltage utilizing a sixth relationship which uses determined optimum torque, said control voltage determination being performed after receiving the third determined signal, and then outputting a fourth determined signal which is indicative of the determined control voltage; and controlling electric current supplied to a magnetizing coil of the electro-magnetic particle clutch corresponding to the determined control voltage after receiving the fourth determined signal, whereby a torque transmitted by the electro-magnetic particle clutch from an engine to a transmission means is controlled using at least one of the detected various conditions.

50. The method of claim 49, wherein:

said second relationships comprises seventh through twelfth relationships, the third detecting means comprising fourth through ninth detecting means, and the second determining means determines the total compensation value utilizing at least one of the seventh through twelfth relationships which uses fourth through ninth detected signals outputted from at least one of the fourth through ninth detecting means as parameters, the seventh relationship relating to a first compensation value and first through third driving conditions, the first compensation value having one of a first, second and third value corresponding to one of the first, second and third driving conditions;

the fourth detecting means detects one of the first, second or third driving conditions, and outputs the fourth detected signal, whereby when the fourth detecting means detects the first driving condition the fourth detected signal corresponding to the first value is outputted from the fourth detecting means, when the fourth detecting means detects the second driving condition the fourth detected signal corresponding to the second value is outputted, and when the fourth detecting means detects the third driving condition the fourth detected signal corresponding to the third value is outputted;

the eighth relationship is between a second compensation value and a temperature of the engine, the fifth detecting means detecting the temperature of the engine and outputting the fifth detected signal;

the ninth relationship relating to a third compensation value and a steering angle of a steering wheel, the sixth detecting means detecting the steering angle and outputting the sixth detected signal;

the tenth relationship is between a fourth compensation value and an incline of a road on which the vehicle starts driving, the seventh detecting means detecting the incline of the road and outputting the seventh detecting signal;

the eleventh relationship is between a fifth compensation value and a weight of a vehicle, the eighth detecting means detecting the weight of the vehicle and outputting the eighth detecting signal; and the twelfth relationship is between a sixth compensation value and a friction coefficient of the road on which the vehicle begins moving, the ninth detecting means detecting the friction coefficient of the road and outputting the ninth detecting signal.

51. An apparatus for controlling an electro-magnetic particle clutch in a vehicle comprising:

load detecting means for detecting a load and for outputting a detected load signal;

engine speed detecting means for detecting an engine speed and for outputting a detected engine speed signal;

processor means comprising tentative engine speed calculating means, total compensation calculating means, desired engine speed calculating means, feedback gain calculating means, and optimum torque determination means;

said tentative engine speed calculating means for calculating a tentative engine speed in response to said detected load signal;

said total compensation value calculating means for calculating a total compensation value in response to a vehicle driving condition;

said desired engine speed calculating means for calculating a desired engine speed in response to said tentative engine speed and said total compensation value;

said feedback gain calculating means for calculating a feed back gain in response to said detected load signal and said calculated desired engine speed;

said optimum torque determination means for determining an optimum torque in response to said calculated feed back gain, detected engine speed, and an idle engine speed; and controlling means responsive to said optimum torque determination means for controlling electric current supplied to said electro-magnetic particle clutch to thereby control a torque transmitted from an engine to a transmission means by said electro-magnetic particle clutch.

52. An apparatus for controlling an electro-magnetic particle clutch in a vehicle comprising:

load detecting means for detecting a load and for outputting a detected load signal;

engine speed detecting means for detecting an engine speed and for outputting a detected engine speed signal;

processor means comprising engine torque calculating means, tentative engine speed calculating means, total compensation valve calculating means, desired engine speed calculating means, feedback gain calculating means and optimum torque determination means;
said engine torque calculating means for calculating an engine torque in response to said detected load signal and said detected engine speed signal;
said tentative engine speed calculating means for calculating a tentative engine speed in response to said detected load;
said total compensation value calculating means for calculating a total compensation value in response to a vehicle driving condition;
said desired engine speed calculating means for calculating a desired engine speed in response to said tentative engine speed and said total compensation value;
said feedback gain calculating means for calculating a feedback gain in response to said detected load signal and rate of change of said detected load signal;
said optimum torque determination means for determining an optimum torque in response to said calculated engine torque, said detected engine speed, said desired engine speed, and said calculated feedback gain; and
controlling means responsive to said optimum torque determination means for controlling electric current supplied to an electro-magnetic particle clutch thereby a torque transmitted from an engine to a transmission means by said electro-magnetic particle clutch is controlled.

53. An apparatus for controlling an electro-magnetic particle clutch in a vehicle comprising:
load detecting means for detecting a load and for outputting a detected load signal;
engine speed detecting means for detecting an engine speed and for outputting a detected engine speed signal;
processor means comprising engine torque calculating means, desired engine speed calculating means, feedback gain calculating means and optimum torque determination means;
said engine torque calculating means for calculating an engine torque in response to said detected load signal and said detected engine speed signal;
said desired engine speed calculating means for calculating a desired engine speed in response to said detected load signal and a vehicle driving condition;
said feedback gain calculating means for calculating a feedback gain in response to said detected load signal and a rate of change of said detected load signal;
said optimum torque determination means for determining an optimum torque in response to said detected engine torque, detected engine speed, said calculated desired engine speed, and said calculated feedback gain; and
controlling means responsive to said optimum torque determination means for controlling electric current supplied to an electro-magnetic particle clutch to thereby control a torque transmitted from an engine to a transmission means by said electro-magnetic particle clutch.

* * * * *